United States Patent
Brady et al.

(10) Patent No.: US 7,505,130 B2
(45) Date of Patent: *Mar. 17, 2009

(54) STATIC TWO-DIMENSIONAL APERTURE CODING FOR MULTIMODAL MULTIPLEX SPECTROSCOPY

(75) Inventors: David J. Brady, Durham, NC (US); Scott T. McCain, Durham, NC (US); Michael E. Gehm, Marana, AZ (US); Michael E. Sullivan, Raleigh, NC (US); Prasant Potuluri, Raleigh, NC (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/942,420

(22) Filed: Nov. 19, 2007

(65) Prior Publication Data

US 2008/0106732 A1    May 8, 2008

Related U.S. Application Data

(63) Continuation of application No. 11/334,546, filed on Jan. 19, 2006, now Pat. No. 7,301,625.

(51) Int. Cl.
*G01J 3/04* (2006.01)
*G01J 3/28* (2006.01)

(52) U.S. Cl. .......... 356/310; 356/328; 356/330
(58) Field of Classification Search .......... 356/310, 356/330
See application file for complete search history.

(56) References Cited

U.S. PATENT DOCUMENTS

| 5,627,639 | A  | * | 5/1997 | Mende et al. | 356/310 |
| 7,092,101 | B2 | * | 8/2006 | Brady et al. | 356/456 |
| 7,180,588 | B2 | * | 2/2007 | Geshwind et al. | 356/310 |
| 7,301,625 | B2 | * | 11/2007 | Brady et al. | 356/310 |
| 2006/0092414 | A1 | * | 5/2006 | Geshwind et al. | 356/310 |

OTHER PUBLICATIONS

Mende et al., Hadamard sprectroscopy with a two-dimensional detecting array, Applied Optics, vol. 32, No. 34, Dec. 1, 1993.*

* cited by examiner

*Primary Examiner*—F. L Evans
(74) *Attorney, Agent, or Firm*—Kasha Law LLC; John R. Kasha

(57) ABSTRACT

A class of aperture coded spectrometer is optimized for the spectral characterization of diffuse sources. The instrument achieves high throughput and high spatial resolution by replacing the slit of conventional dispersive spectrometers with a spatial filter or mask. A number of masks can be used including Harmonic masks, Legendre masks, and Hadamard masks.

22 Claims, 23 Drawing Sheets

800

STATIC TWO-DIMENSIONAL APERTURE CODING FOR MULTIMODAL MULTIPLEX SPECTROSCOPY

This application is a continuation application of U.S. patent application Ser. No. 11/334,546, filed Jan. 19, 2006, which claims the benefit of the filing date of U.S. Provisional Appln. No. 60/644,522, filed Jan. 19, 2005 (the "'522 application"), and U.S. Provisional Appln. No. 60/705,173, filed Aug. 4, 2005 (the "'173 application"), both of which are hereby incorporated by reference in their entireties.

BACKGROUND OF THE INVENTION

1. Field of the Invention

Embodiments of the present invention relate to aperture-coded spectroscopy. More particularly, embodiments of the present invention relate to systems and methods for estimating the mean spectral density of a diffuse source in a single time step of parallel measurements using a static multimode multiplex spectrometer.

2. Background Information

A diffuse source is a source that inherently produces a highly spatially-multimodal optical field. In simplest terms, this is a spatially-extended source with an angularly-extended radiation pattern. The constant radiance theorem complicates the characterization of such sources. In short, entropic considerations require that the modal volume of a source cannot be reduced without a concomitant reduction in power. As a result, the brightness of diffuse sources cannot be increased.

This is particularly unfortunate in the case of spectroscopy, as traditional spectrometers utilize narrowband spatial filtering to disambiguate between spatial and spectral modes of the field. A dispersive element produces a wavelength-dependent shift of the image of an input slit. Since each spectral channel must correspond to a unique shift, the spectral width of a resolution element is directly proportional to the slit width.

This relationship provides a challenge to diffuse source spectroscopy. To achieve a reasonable spectral resolution, the input slit to the spectrometer must be narrow. However, because the source is diffuse, the radiation field cannot be focused through the slit. Instead, only a small fraction of the light can enter the instrument. If the source is weak as well as diffuse, then the instrument may be so photon starved that no spectral measurement is possible.

The throughput of an optical instrument, sometimes referred to as the etendue, can be approximated as the product of the area of the input aperture and the solid angle from which the instrument will accept light. The acceptance solid angle is determined by the internal optics of an instrument. For a given optical arrangement, the only way to increase the etendue of the system is to increase the size of the input aperture. However, such an approach reduces the resolution of the spectrometer as it increases the throughput.

Consequently, two primary challenges in diffuse source spectroscopy are maximizing spectrometer throughput without sacrificing spectral resolution and maximizing the signal-to-noise-ratio (SNR) of the estimated spectrum for a given system throughput and detector noise.

Both problems have been long-studied and a number of designs have been proposed to address one or both. A design that solves the first problem is said to have a Jacquinot (or large-area or throughput) advantage. A design that solves the second problem is said to have a Fellgett (or multiplex) advantage.

The earliest approach to solving these problems was through coded aperture spectroscopy, where the input slit is replaced with a more complicated pattern of openings. The first coded aperture spectrometer was created in the early 1950s. Advancements followed rapidly over the next several decades. As the mathematical treatments gained sophistication, the appeal of apertures based on Hadamard matrices became apparent, and the majority of coded aperture spectrometers became Hadamard transform (HT) spectrometers. Over most of their development, however, HT spectrometers had only single-channel detectors or limited arrays of discrete detectors. As a result, most designs contained at least two coding apertures, one at the input plane and one at the output plane. Further, the designs usually required motion of one mask with respect to the other. The majority of the resulting instruments exhibited only the Jacquinot advantage or the Fellgett advantage.

In a coded aperture spectrometer, a coded aperture or mask is used to convert intensity information into frequency or spectral information. The basic elements of a coded aperture imaging spectrometer are described in Mende and Claflin, U.S. Pat. No. 5,627,639 (the '639 patent), for example. Light from multiple locations on a target is incident on a mask. The mask contains rows and columns of both transmissive and opaque elements. The transmissive and opaque elements are located on the mask according to a transfer function used to convert intensity information of the incident light to spectral information. The transmissive elements transmit the incident light, and the opaque elements block the incident light. A grating is used to disperse the transmitted light from the transmissive elements in a linear spatial relationship, according to the wavelength of the transmitted light. The dispersed light is incident on a detector array. The detector array contains rows and columns of detector elements. The detector array elements are designed to receive a different range of wavelengths from each transmissive element of the mask and provide a signal indicative the intensity of the light received.

In the '639 patent, the mask is translated in one direction relative to the target over time. As the mask is translated, a data matrix is generated. The data matrix contains light intensity data from each row of the detector array as light incident from the same target elements passes through a corresponding row of the mask. The intensities recorded by the rows and columns of detector elements are collected over time and assembled in a data matrix for each set of target elements.

A frequency spectrum is obtained for each set of target elements by converting the data matrix according to the transfer function. In the '639 patent, a pattern matrix is predetermined from the mathematical representation of the mask elements. Transmissive elements of the mask are represented as a '1' in the pattern mask, and opaque elements of the mask are represented as a '0' in the pattern mask. A frequency matrix representing the frequency spectrum is obtained by multiplying the data matrix by the inverse pattern matrix and a factor that is a function of the number of transmissive elements and number of total mask elements.

Coded aperture spectroscopy was proposed in Golay, M. J. E. (1951), "Static multislit spectrometry and its application to the panoramic display of infrared spectra," *Journal of the Optical Society of America* 41(7): 468-472. Two-dimensional coded apertures for spectroscopy were developed in the late 1950's and early 1960's as described, for example, in Girard, A. (1960), "Nouveaux dispositifs de spectroscopic a grande luminosite," *Optica Acta* 7(1): 81-97.

For the first 40 years of coded aperture spectroscopy, coded aperture spectroscopy instruments were limited to single optical detector elements or small arrays of discrete detectors. Reliance on single detectors required mechanical, electro-optical, liquid crystal, or other forms of modulation to read spectral data. These early coded aperture instruments implemented spectral processing by using both an entrance and an exit coded aperture and a single detector element or a detector element pair.

High quality two-dimensional electronic detector arrays were in use by the 1990's, as described in the '639 patent, for example. Despite the availability of these high quality two-dimensional electronic detector arrays, coded aperture instruments combining entrance and exit coded apertures for two-dimensional codes are still in use today, as described, for example in Shlishevsky, V. B. (2002), "Methods of high-aperture grid spectroscopy," *Journal Of Optical Technology* 69(5): 342-353.

The use of Hadamard codes in coded aperture spectroscopy was described in detail in Harwit, M. and N. J. A. Sloane (1979), *Hadamard transform optics*, New York, Academic Press, the subject matter of which is incorporated herein by reference. The '639 patent describes a two-dimensional Hadamard code design where the elements of each row of the mask are arranged in a Hadamard pattern, and each row of the mask has a different cyclic iteration of an m-sequence. A two-dimensional Hadamard code mask design with appropriately weighted row and column codes that form an orthogonal family is described F. A. Murzin, T. S. Murzina and V. B. Shlishevsky (1985), "New Grilles For Girard Spectrometers," *Applied Optics* 24 (21): 3625-3630, for a spectrometer using both entrance and exit coded apertures and a single detector element or a detector element pair.

Aperture coding is not the only approach to solving these spectrometer design problems. Interferometric spectrometers, such as Fourier transform (FT) spectrometers, can also exhibit the Jacquinot and Fellgett advantages. The FT spectrometer, in fact exhibits both. However, the majority of FT spectrometers contain mechanical scanning elements.

In view of the foregoing, it can be appreciated that a substantial need exists for systems and methods that can advantageously provide for maximum spectrometer throughput without sacrificing spectral resolution and maximum SNR of the estimated spectrum for a given system throughput and detector noise.

SUMMARY OF THE INVENTION

A class of aperture coded spectrometer is optimized for the spectral characterization of diffuse sources. The spectrometer achieves high throughput and high spatial resolution by replacing the slit of conventional dispersive spectrometers with a spatial filter or mask. A number of masks can be used including Harmonic masks, Legendre masks, and Hadamard masks.

In one embodiment, the present invention is a static multimode multiplex spectrometer (MMS). The MMS includes a two-dimensional orthogonal column code mask, wherein source radiation is incident on the mask, wherein the transmissive and opaque elements of the mask are arranged according to a transfer function represented mathematically as a coding matrix, and wherein each column of the coding matrix is orthogonal under an inner product transformation. The MMS further includes a dispersive element aligned with the code mask, wherein source radiation transmitted through the mask is incident on the dispersive element such that the dispersive element induces a wavelength dependent spatial shift of the image of the mask. The MMS further includes a two-dimensional detector array aligned with the dispersive element, wherein source radiation from the dispersive element is incident on the array, wherein the array comprises row and column detector elements, and wherein the detector elements convert the wavelength dependent spatial shift image of the mask into a light intensity values. The MMS also includes a processing unit, wherein the processing unit stores the values in a data matrix and performs a transformation of the data matrix using the coding matrix to produce a spectrum matrix that is a mathematical representation of a spectral density of the source radiation. The processing unit can be a computer, a microprocessor, or an application specific circuit.

Figure 1:
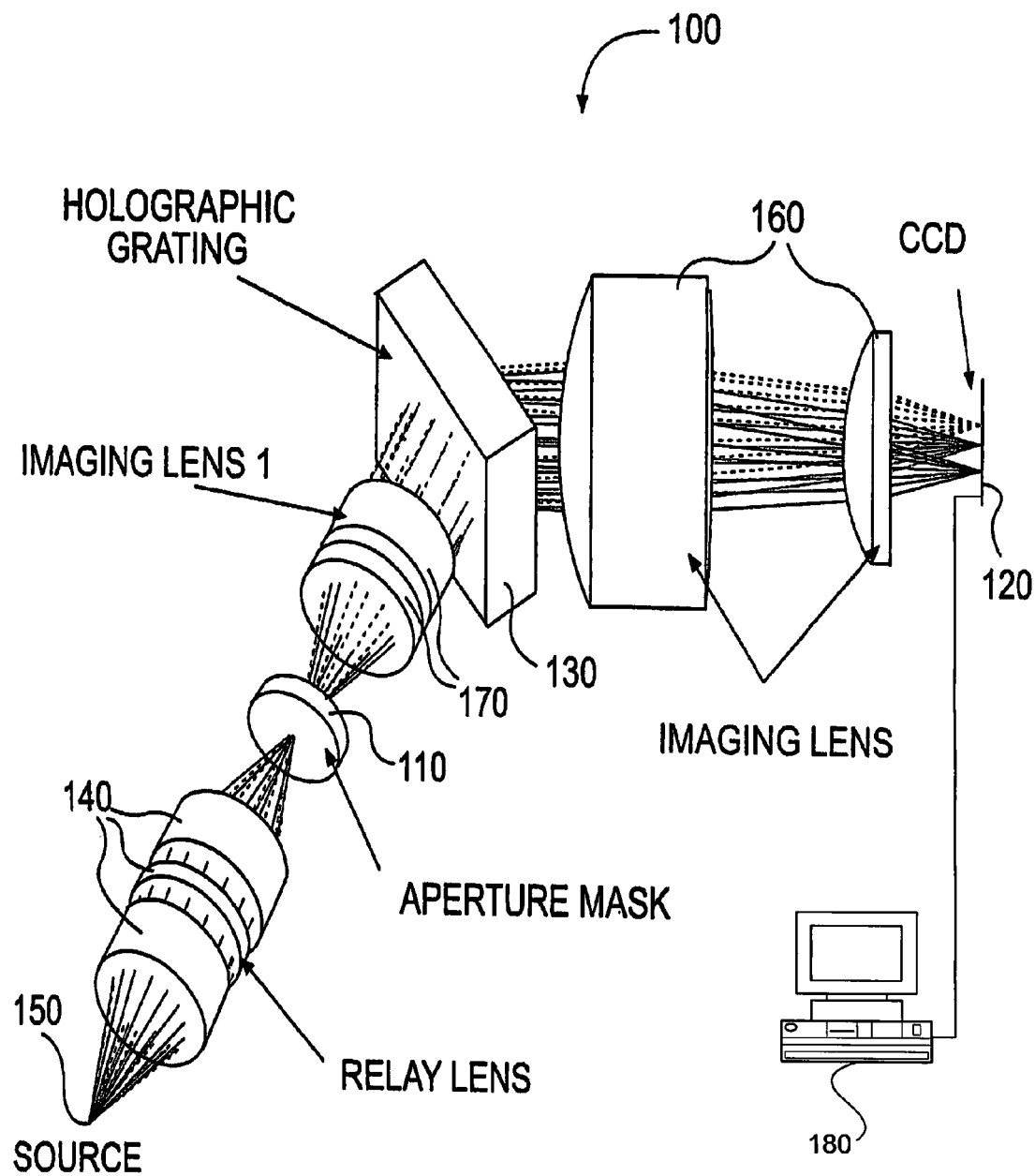
FIG. 1 is a schematic diagram of an exemplary multimode multiplex spectroscopy system, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments of being practiced or being carried out in various ways. Also, it is to be understood that the phraseology and terminology used herein is for the purpose of description and should not be regarded as limiting.

DETAILED DESCRIPTION OF THE INVENTION

Embodiments of systems and methods relate to a two-dimensional orthogonal column code multimodal spectrometer and spectral imager are described in this detailed description of the invention, which includes the accompanying Appendix 1 of the '522 application and Appendix 1 of the '173 application. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Embodiments of the present invention provide a static two-dimensional aperture coding for multimodal multiplex spectroscopy. Below, a mathematical model of a dispersive spectrometer is derived, and it is shown how simple aperture codes can result in both Jacquinot and Fellgett advantages. Several different classes of aperture patterns are described. In addition, experimental results from static multimodal multiplex spectroscopy are presented.

A primary goal of a static multimode multiplex spectrometer (MMS) is to estimate the mean spectral density $S(\lambda)$ of a diffuse (multimodal) source. "Static" refers to the lack of mechanical, electro-optical or other active modulation in forming the source estimate. A preferred static MMS estimates $S(\lambda)$ in a single time step of parallel measurements. A preferred MMS system measures spectral projections of the field drawn from diverse modes or points and combines these projections to produce an estimate of the mean spectral density.

FIG. 1 is a schematic diagram of an exemplary MMS system 100, in accordance with an embodiment of the present invention. System 100 is a grating spectrometer with a two-dimensional coded aperture mask 110 taking the place of the entrance slit of a conventional system. Unlike many previous coded aperture spectrometers, system 100 does not use an output slit. The output aperture is fully occupied by a two-dimensional optical detector array 120.

System 100 images aperture coding mask 110 onto optical detector array 120, through a dispersive element 130. Aperture coding mask 110 preferably contains aperture codes and weighting on the aperture codes such that each column of the pattern or coding matrix is orthogonal under an inner product transformation. Optical detector array 120 is a two-dimensional charge coupled device (CCD), for example. Optical detector array 120 can also be an active pixel photodetector array, a microbolometer array, or a photodiode. Dispersive element 130 can include but is not limited to a grating, a holographic grating, or a prism. Dispersive element 130 can include a combination of dispersive elements. Dispersive element 130 induces a wavelength dependent spatial shift of the image of aperture coding mask 110 on detector array 120.

System 100 preferably includes a relay optical system 140. Relay optical system 140 is used to convert a non-uniform spectral density of source radiation 150 to a substantially uniform spectral density in at least one direction. System 100 also preferably includes an imaging lens system 160, an imaging lens system 170, and a processing unit 180. The combined imaging system 160 and 170 is designed to form an image of the aperture mask 110 on the focal plane 120 through the grating 130 such that the image position shifts linearly as a function of illumination wavelength.

The system will be described by considering the following simplied model of a dispersive spectrometer:

$$I(x',y')=\int\int\int d\lambda dxdy H(x,y)(T(x,y)S(x,y,\lambda) \quad (12)$$

Figure 2:
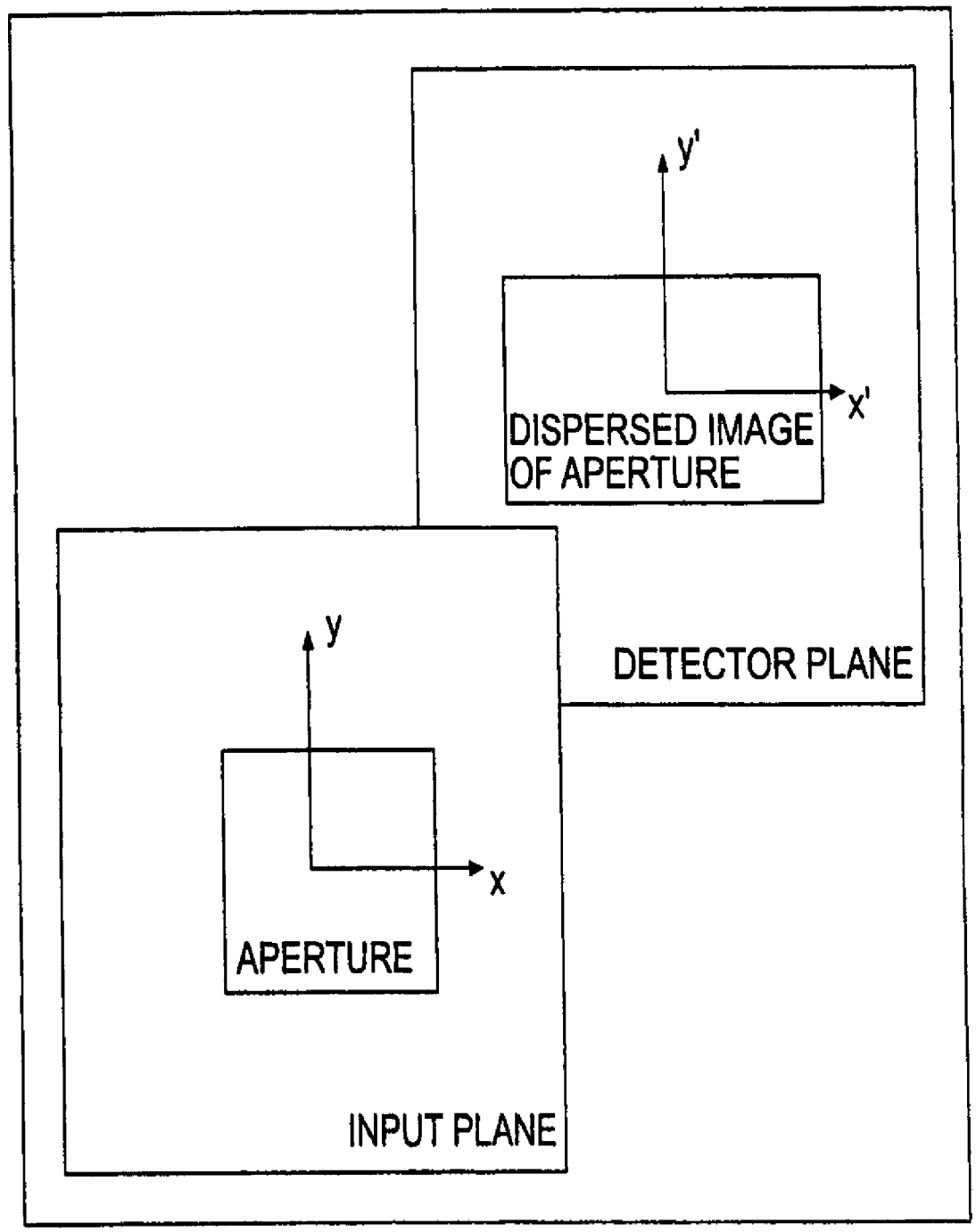
FIG. 2 illustrates a coordinate system used to describe embodiments of the present invention.

Here, H(x,y) is the kernel describing propagation through the spectrometer, T(x, y) is a transmission function describing the input aperture and $S(x,y,\lambda)$ is the input spectral density at position (x, y). As illustrated in FIG. 2, for the description of the alternative embodiments of the present invention, the coordinate system is defined as follows: unprimed variables denote quantities defined in the input plane, and primed variables denote quantities in the detector plane.

A propagation kernel for a dispersive spectrometer according to an embodiment of the present invention may be modeled as $H(x,y)=\delta(y-y')\delta(x-(x'+\alpha(\lambda-\lambda_c)))$. This kernel represents a basic dispersive spectrometer with unity-magnification optics, a linear dispersion a in the x-direction, and a center wavelength of $\lambda_c$, for an aperture at x=0. Inserting the propagation kernel of Eqn. (12) and performing the $\lambda$- and y-integrals yields $$I(x', y) = \int dx T(x, y') S\left(x, y, \frac{x-x'}{\alpha} + \lambda_c\right). \quad (13)$$

A traditional slit-spectrometer takes the input aperture as $T(x, y)=\delta(x)$, so that $$I(x', y') = S\left(0, y, \lambda_c - \frac{x'}{\alpha}\right) \quad (14)$$

Eqn. (14) reveals that the intensity profile in the detector plane is a direct estimate of the spectral density at the slit location. However, as discussed above, due to the narrowness of the slit, the drawback to such an approach is that the throughput of the system is severely curtailed. More complicated aperture patterns, however, can increase the photon collection efficiency of the system.

As described above, a goal of the MMS is to develop an aperture code that permits estimation of the mean spectrum across an extended aperture. The mean spectrum across an extended aperture is defined as:

$$S_{mean}(\lambda) \propto \int\int dx dy S(x,y,\lambda). \quad (15)$$

In the more general case, to convert the intensity profile of Eqn. (13) into an estimate of the mean spectrum, it is multiplied by an analysis function $\tilde{T}(x'',y')$ and integrated over the extent of the patterns in y':

$$E(x', x'') = \int_{y'_{min}}^{y'_{max}} dy' \tilde{T}(x'', y') I(x', y') \quad (16)$$

$$= \int_{y'_{min}}^{y'_{max}} dy' \int dx \tilde{T}(x'', y') T(x, y') S\left(x, y, \frac{x-x'}{\alpha} + \lambda_c\right)$$

A simplification is that $S(x,y,\lambda)$ is constant, or slowly varying in y. As a result, $S(x, y, \lambda)$ can be written as:

$$S(x,y',\lambda) \approx I(y) S(x,\lambda) \quad (17)$$

Inserting Eqn. (17) into Eqn. (18) yields $$E(x', x'') \approx \int_{y'_{min}}^{y'_{max}} dy' \int dx \tilde{T}(x'', y') T(x, y') I(y) S\left(x, \frac{x-x'}{\alpha} + \lambda_c\right) \quad (18)$$

If $T(x, y)$ and $\tilde{T}(x'',y')$ are constructed such that $$\int_{y'_{min}}^{y'_{max}} dy' \tilde{T}(x'', y') T(x, y') I(y') = \beta \delta(x - x'') \quad (19)$$

then the estimate of the mean spectrum becomes $$E(x', x'') \approx \beta \int dx \delta(x - x'') S\left(x; \frac{x-x'}{\alpha} + \lambda_c\right) \quad (20)$$

$$\approx \beta S\left(x''; \frac{x''-x'}{\alpha} + \lambda_c\right)$$

Eqn. (20) can be interpreted as a two-dimensional function containing estimates of the input spectrum at different input locations. A slice through this function at a constant value of x" corresponds to the input spectrum at a particular value of x. In other words, at this point, a 1D imaging spectrometer. has been created. Conversion of E(x', x") into an estimate of $S_{mean}(\lambda)$ is described below.

Since the spectral estimates of Eqn. (20) are shifted with respect to each other, to calculate the mean spectrum, integration is performed along the line $x'=\lambda\alpha+x''$:

$$S_{mean}(\lambda_c - \lambda) \propto \quad (21)$$

$$\int\int dx'' dx' \delta[x' - \lambda\alpha + x''] E(x'x'') \propto \int dx'' S(x'', \lambda_c - \lambda)$$

Thus with appropriately designed input apertures and analysis functions, we can convert an intensity profile at the detector plane into an estimate of the input spectrum. But how does one perform this design subject to the constraint of Eqn. (19)?

Eqn. (19) can be written in a form where x and x" are parameters rather than coordinates.

$$\int_{y'_{min}}^{y'_{max}} dy \tilde{T}_{x''}(y') T_x(y) I(y) = \beta \delta(x - x'') \quad (22)$$

Eqn. (22) is identical to the orthogonality constraint for eigenfunctions in Sturm-Liouville theory, with I(y) acting as the weighting function and p acting as the norm. Therefore, the design requirement of Eqn. (19) can be met by basing the input aperture pattern on any family of orthogonal functions.

Using the language of Sturm-Liouville theory, if T and $\tilde{T}$ are the same set of codes, the system is self-adjoint. In such a case, the complete set of codes in T can be viewed as abstract vectors defining an orthogonal basis on a Hilbert space, such a family of codes is referred to as an orthogonal column code.

If T and $\tilde{T}$ are not the same set of codes, the system is said to be non-self-adjoint. In such a case, complete set of codes in T can be viewed as abstract vectors defining a non-orthogonal basis on a Hilbert space. Such a family of codes is referred to as an independent column code.

In Eqn. (22), x and x' can be either continuous or discrete parameters depending on the eigenvalue spectrum of the chosen family of functions. In the discrete case, the Dirac delta function $\delta(x-x'')$ is properly replaced with the Kronecker delta $\delta_{xx'}$. Further, in this case the input mask and analysis pattern are pixelated in the x and x" directions, respectively.

Considerable insight can be gained from a heuristic view of orthogonal and independent column coding. From Eqn. (13), we see that, for the case of uniform input intensity, the output intensity distribution is a convolution of the input aperture and the input spectrum:

$$I(x', y') = \int dx T(x, y') S\left(\frac{x-x'}{\alpha}\right). \quad (23)$$

Thus, the light falling at a given value of x' in the detector plane arises from a combination of different wavelengths passing through different locations on the input aperture. A well-designed code allows breaking this ambiguity and determining the spectral content of the light. By choosing a family of functions for the transmission mask, a unique code to each possible x-location in the input plane is provided. The transmission pattern at position x can be viewed as an abstract vector $|T_x\rangle$. The full family of transmission patterns then forms a basis $\{|T_x\rangle\}$. If we consider the light distribution falling at a given x'-location in the detector plane as the abstract vector $|I_{x'}\rangle$, the contribution from position x on the input aperture is simply given by $\langle T_x|I_{x'}\rangle$, the projection of $|I_{x'}\rangle$ onto the adjoint of the corresponding vector ($\langle T_x| \equiv |T_x\rangle^\dagger$). Because only light of wavelength $\lambda_{x,x'}=(x-x')/\alpha+\lambda_c$ can propagate from x to x', this inner product also represents an estimate of $S(x,\lambda_{x,x'})$. Forming the set of all inner products of the form $\langle T_x|I_{x'}\rangle$, yields the 2D spectral estimate function E.

The section above demonstrates the appeal of using orthogonal or independent column codes as aperture mask patterns in dispersive spectroscopy. The number of possible families is, of course, infinite. The following sections describe certain specific families of interest.

Above, the intensity profile I(y) was shown to act as a weighting function in Sturm-Liouville theory and, in conjunction with the integration limits, controls the nature of the orthogonal functions. A uniform input intensity, symmetric integration limits ($y'_{min}=-Y$, $y'_{max}=Y$), and a discrete eigenvalue spectrum, provides the constraint:

$$\int_{-Y}^{Y} dy \tilde{T}_{x''}(y) T_x(y) = \beta \delta_{xx''} \quad (24)$$

This constraint is satisfied by the well known harmonic functions. For example, $$T_X, \tilde{T}_{x''} \in \left\{\cos\left(m\frac{y\pi}{Y}\right)\right\}, m \in Z^+, \quad (25)$$

is a self-adjoint solution to Eqn. (24).

However, there is a problem with this set of functions. Because the illumination is incoherent, $T_x$ can only modulate the intensity of the light, not the field. As a result, only functions with values in the interval [0,1] can be used.

This has a significant impact on the nature of the solutions that we may find. It is not possible to find a self-adjoint set of continuous functions that meets this requirement. Since negative values are not allowed, the inner product between any two such functions is positive definite. Hence the functions in $T_y$ cannot also be the functions in $\tilde{T}_{xx''}$. Thus, an independent column code must be considered.

One possible independent column code based on harmonic functions is:

$$T_x \in \left\{\frac{1}{2}\left(1+\cos\left(m\frac{y\pi}{Y}\right)\right)\right\}, m \in Z^+. \quad (26)$$

The corresponding analysis codes are then:

$$\tilde{T}_{x''} \in \left\{2\cos\left(m\frac{y\pi}{Y}\right)\right\}, m \in Z^+. \quad (27)$$

Figure 3:
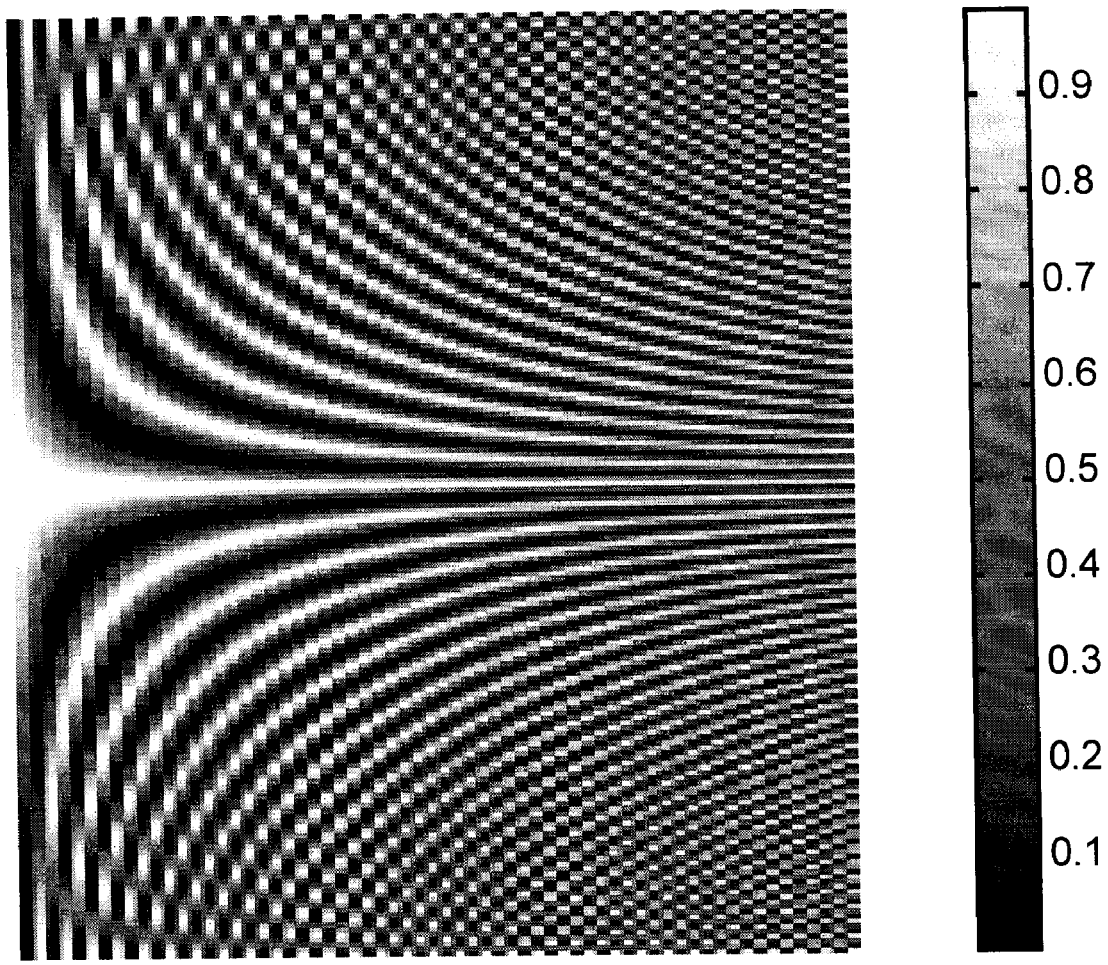
FIG. 3 is an exemplary aperture pattern for an independent column code based on harmonic functions according to an embodiment of the present invention.

An aperture mask based on this independent column code with m=1-64 is shown in FIG. 3. The codes have been chosen such that the transmission has physically-realizable values in the interval [0,1]. The exemplary pattern illustrated in FIG. 3 is continuous vertically, but discrete horizontally.

Well known Legendre polynomials also satisfy the constraint of Eqn. (24). The Legendre polynomials can be written as:

$$P_n(y) = \frac{1}{2^n} \sum_{m=0}^{n/2} (-1)^m \binom{n}{m}\binom{2n-2m}{n} y^{n-2m} \quad (28)$$

where $$\binom{a}{b} = \frac{a!}{(a-b)!b!} \quad (29)$$

As was the case with the harmonic masks, the functions form a self-adjoint set of codes:

$$T_X, \tilde{T}_{x''} \in \left\{P_m\left(\frac{y}{Y}\right)\right\}, m \in Z^+. \quad (30)$$

However, as above, these codes involve modulation values which are not physically possible in an incoherent system. Scaling to produce physically-realizable values results in an independent column code. For example, one possible version is $$T_X \in \left\{\frac{1}{2}\left(1+P_m\left(\frac{y}{Y}\right)\right)\right\}, m \in Z^+. \quad (31)$$

The corresponding analysis codes are then:

$$\tilde{T}_{x''} \in \left\{2P_m\left(\frac{y}{Y}\right)\right\}, m \in Z^+. \quad (32)$$

Figure 4:
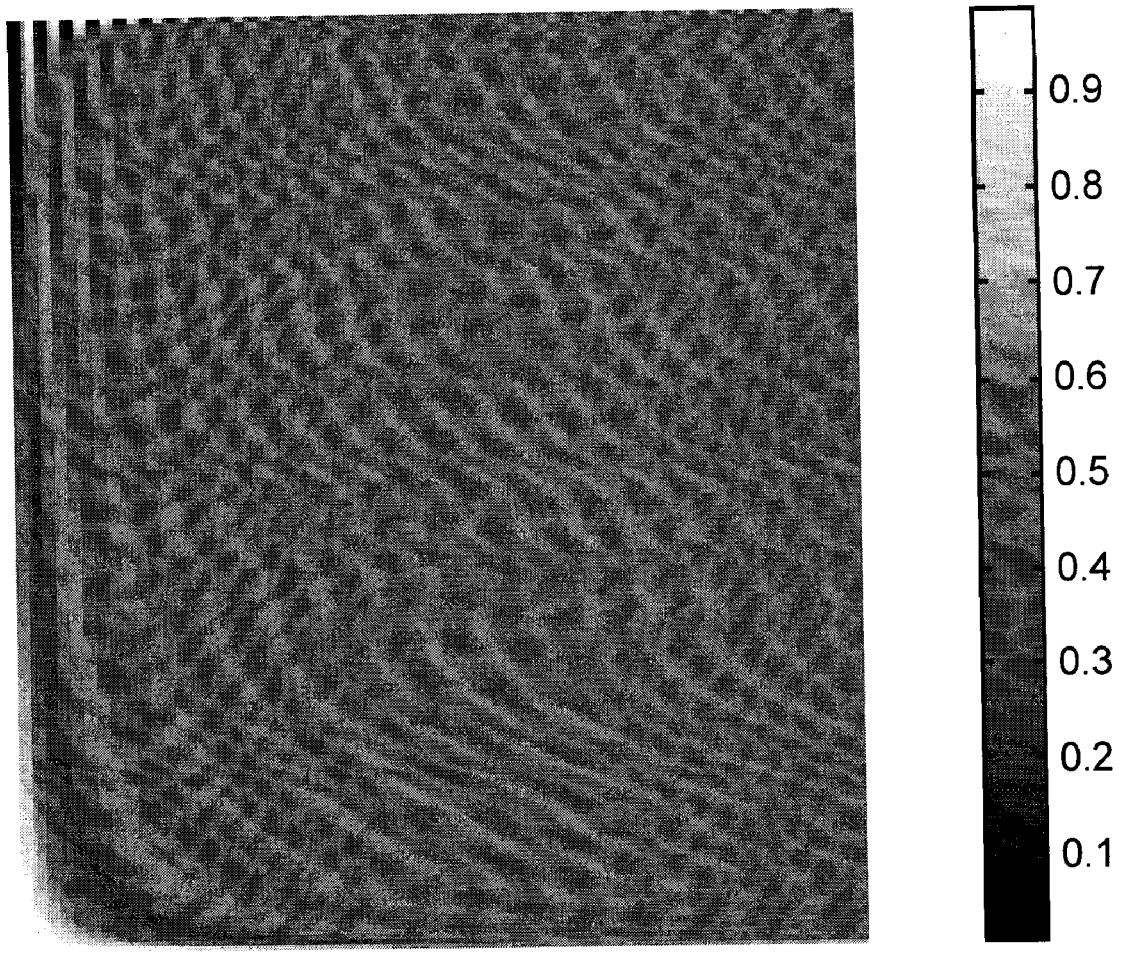
FIG. 4 is an exemplary aperture pattern for an independent column code based on Legendre polynomials according to an embodiment of the present invention.

An aperture mask based on this independent column code with m=1-64 is shown in FIG. 4. The codes have been chosen such that the transmission has physically-realizable values in the interval [0,1]. The exemplary pattern illustrated in FIG. 4 is continuous vertically, but discrete horizontally.

In the previous sections, only continuous functions of y have been considered as possible code families. Based on the heuristic insights described above in paragraph [0060], it seems reasonable to also consider discontinuous functions that are pixelated in the y direction. A choice, for example, are pixelated functions based on Hadamard matrices. We define $H_n$ as an order-n Hadamard matrix, and use the symbols $H_n(:, m)$ and $H_n(m, :)$ to refer to the mth column and row of Hn, respectively. Then $$T_X, \tilde{T}_{x'} \in \{H_n(:,m)\}, m \leq n \tag{33}$$

is a self-adjoint set of codes. Given that the elements of a Hadamard matrix are either 1 or −1, this is again not realizable with incoherent illumination. Shifting and scaling the code values results in a non-self-adjoint independent column code $$T_X \in \left\{ \frac{1}{2}(1 - H_n(:, m)) \right\}, m \leq n. \tag{34}$$

With the corresponding analysis code $$\tilde{T}_{x'} \in \{2H_n(:,m)\}, m \leq n. \tag{35}$$

Figure 5:
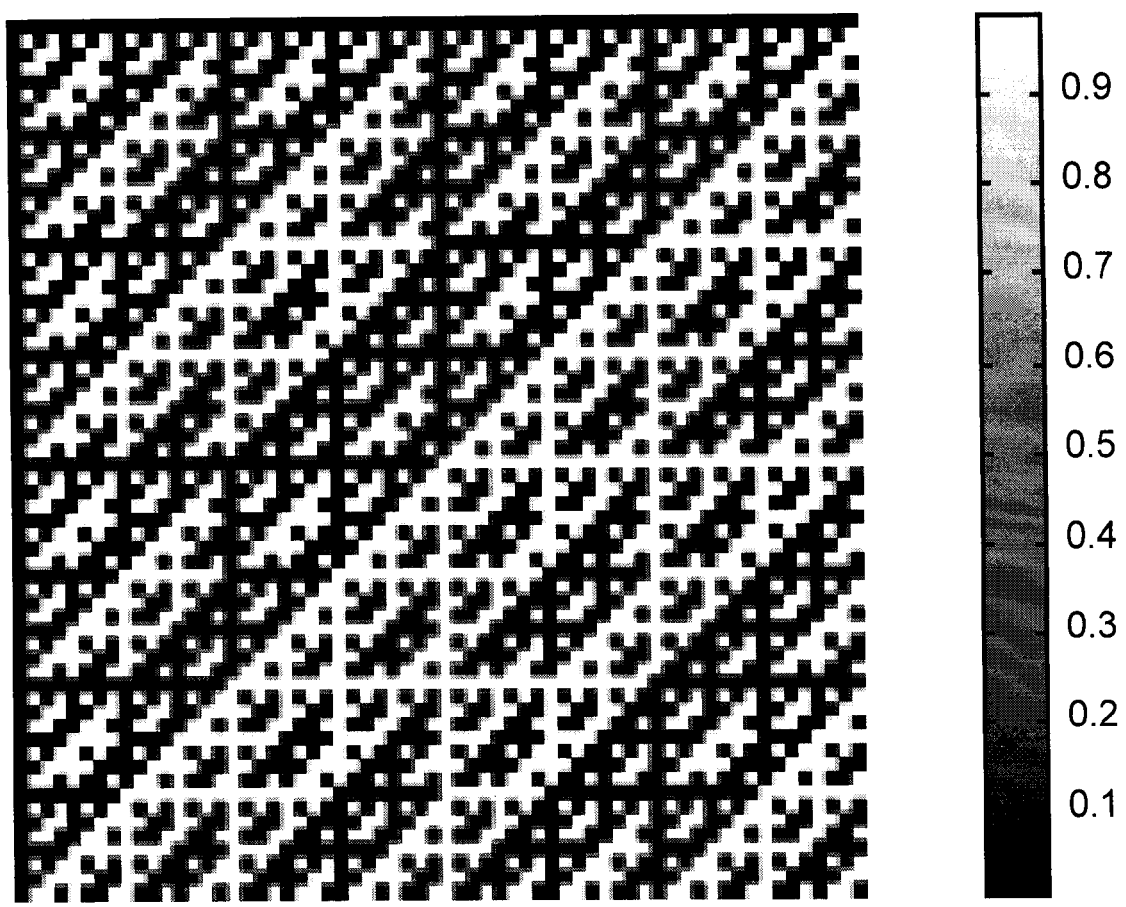
FIG. 5 is an exemplary aperture pattern for an independent column code based on a Hadamard matrix according to an embodiment of the present invention.

This particular choice is known as an S-matrix in the traditional Hadamard literature. An aperture based on an S-matrix code is shown in FIG. 5. The codes have been chosen such that the transmission has physically-realizable values in the interval [0,1]. The exemplary pattern illustrated in FIG. 5 is discrete both horizontally and vertically.

In all of the aperture masks so far, we have shifted and scaled the code values to achieve a physically-realizable modulation. In every case, the application of a shift has turned an orthogonal column code into an independent column code. However, if we had a method for identifying the sign of a code value, then we could apply the sign in software (by multiplying the measured value by −1 where appropriate). By adding this extra computational step, we could achieve a physically-realizable aperture while avoiding the need for a shift and have a self-adjoint set of codes.

Unfortunately, any row of the code contains both positive and negative values. The multiplex nature of the system then ensures that light from these different regions are combined on the detector plane, making it impossible to apply the appropriate weighting in software. However, positive and negative regions of the code can be segregated onto separate rows. A weighting could then be applied to entire rows in the detector plane and to achieve the desired effect. We refer to codes that have been modified in this manner as row-doubled.

To row-double a Hadamard matrix, each original row $H_n(m,:)$ is replaced with two rows:

$$H_n(m, :) \rightarrow \begin{bmatrix} \frac{1}{2}(1 + H_n(m, :)) \\ \frac{1}{2}(1 - H_n(m, :)) \end{bmatrix} \tag{36}$$

Figure 6:
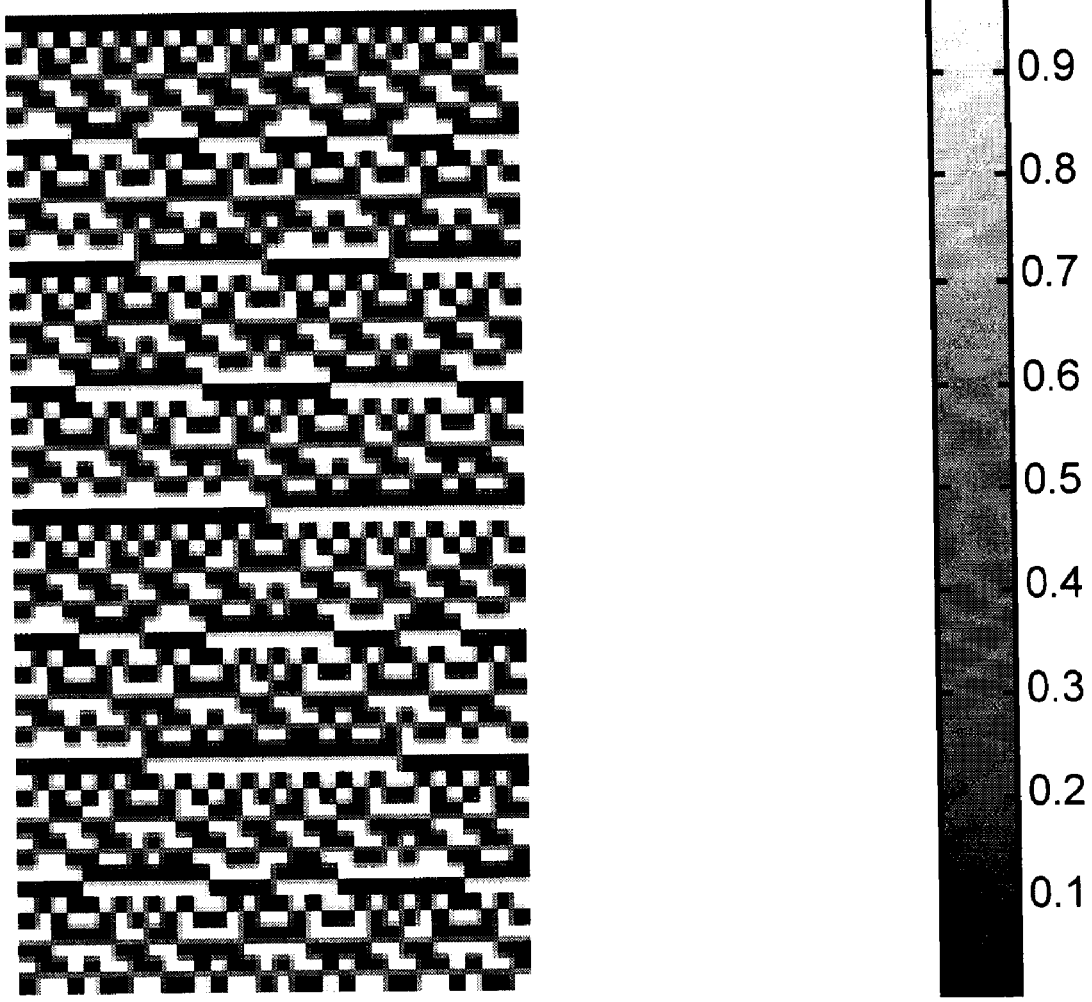
FIG. 6 is an exemplary aperture pattern for an orthogonal column code (in conjunction with processing of the measured intensity) based on a row-double Hadamard matrix according to an embodiment of the present invention.

If a row-doubled version of $H_n$ as denoted $\hat{H}_n$, then $$T_x, \tilde{T}_{x'} \in \{\hat{H}_n(:,m)\}, m \leq n \tag{37}$$

is a physically-realizable orthogonal column code when combined with the now-possible computational step of weighting the appropriate rows in the measurement by −1. An aperture based on a row-doubled Hadamard matrix is shown in FIG. 6. The codes have been chosen such that the transmission has physically-realizable values in the interval [0,1]. The exemplary pattern illustrated in FIG. 6 is discrete both horizontally and vertically.

There is an important difference between the continuous mask codes (harmonic and Legendre) and the discrete codes (S-matrix and row-doubled Hadamard). In the case of the continuous code families, there are an infinite number of possible codes ($m \in Z^+$). This means the underlying Hilbert space is infinite-dimensional. Any physical aperture based on these codes must choose only a subset of the possible code patterns. As a result, the implemented basis is not complete, and Parseval's relation will not hold. In short, in the presence of noise, the total power associated with the different apertures after processing will not necessarily equal the total power measured on the detector plane.

For the discrete codes, however, there is only a finite number of code patterns in any given family ($m \leq n$). The underlying Hilbert space is then n-dimensional, and an aperture can be designed that contains all of the codes. In this case, Parseval's relation will hold and power is necessarily conserved during the processing.

There are a variety of implementation issues where the performance of the real-world system must deviate from the idealizations considered above. The following sections address the most important of these issues.

It was assumed above that access was available to the to the detector plane intensity distribution I(x',y'). However, this is not generally the case. For example, the measurement of the intensity profile has been downsampled by the pixel size on the detector array. This has several important implications for the system. First, for the continuous codes, Eqn. (34) is no longer strictly true. However, it remains approximately true as long as only codes that contain spatial frequencies below the Nyquist limit defined by the pixel size are included.

Second, for the discrete codes, the aperture must be designed so that when imaged onto the detector, the features involve integral numbers of pixels in the y' direction. This places performance requirements on the manufacturing accuracy of the aperture and the magnification of the relay optics in the spectrometer.

Additionally, an aperture involving a discrete code must be aligned with respect to the detector plane such that the divisions between features align with divisions between pixels. This requires sub-pixel positioning ability on the input aperture during construction and alignment.

Physical realities in the previous section limited coding to patterns with values in the interval [0, 1]. However, the fact that a given modulation pattern can be physically imprinted on the input intensity has no bearing on the manufacturability of the required input aperture.

Arbitrarily-patterned, continuous-tone masks with transmissions ranging from 0-100% are indeed possible. However, given the complexity of most orthogonal column code patterns, the cost to manufacture transmission masks to the required precision is prohibitive. One alternative is to convert the designed continuous-tone mask into a half-toned version. A small region of the continuous-tone pattern is subdivided into an array of even smaller subregions. Each of these subregions is assigned a transmission of either 0 or 100%, such that the net transmission in the region matches the grayscale value of the continuous-tone pattern. Provided that the conversion happens on a spatial scale that is smaller than the pixelization of the detector plane, no significant difference should be detectable.

There are a variety of halftoning algorithms available for optimizing the conversion. Examples of such halftoning algorithms can be found in David Blatner, Glenn Fleishman, and Steve Roth, *Real World Scanning and Halftones*, ISBN 0-201-69693-5, 1998; R. W. G. Hunt, *The Reproduction of Color*, Fountain Press, ISBN 0-86343-381-2, 1995; Henry R.

Kang, *Digital Color Halftoning*, SPIE Optical Engineering Press, ISBN 0-8194-3318-7, 1999; Daniel L. Lau and Gonzalo R. Arce, *Modern Digital Halftoning*, Marcel Dekker, ISBN 0824704568, 2001, each of which is hereby incorporated by reference in its entirety.

The internal optics of the spectrometer can have a significant effect on the performance of the system. The optical properties of a static MMS deviate from a traditional instrument in a critical manner. Because the MMS encodes spectral information across the detector plane in a highly non-local way, optical errors anywhere have a non-local effect on the reconstruction, introducing noise and errors at regions throughout the spectral range.

Above, it was assumed that incoherent imaging kernel was given by $H(x,y)=\delta(y-y')\delta(x-(x'+\alpha\lambda+\lambda_c))$. Significant deviation from this assumption leads to degraded (or erroneous) spectral reconstructions. Thus, there are three primary optical requirements:

1. The spectral resolution of the instrument should be limited by the width of a feature on the input mask $\Delta x$. This requires that the size of the incoherent impulse response be small compared to $\Delta x$. Further, the size of the impulse response should not vary significantly across the input and output fields.
2. The impulse responses in the x and y directions should be uncorrelated. This requires that the optical system have low distortion across the input and output fields.
3. The input intensity profile should be unaffected by propagation through the system (aside from a wavelength-dependent shift in x direction. This requires that there be no field-dependent intensity modulations (vignetting) in the system.

The ideal imaging kernel can break down in another way as well. Unfortunately, this issue exists even for an ideal optical system and must either be dealt with through special modifications to the hardware or through software corrections of the detector image prior to spectral reconstruction.

Figure 7:
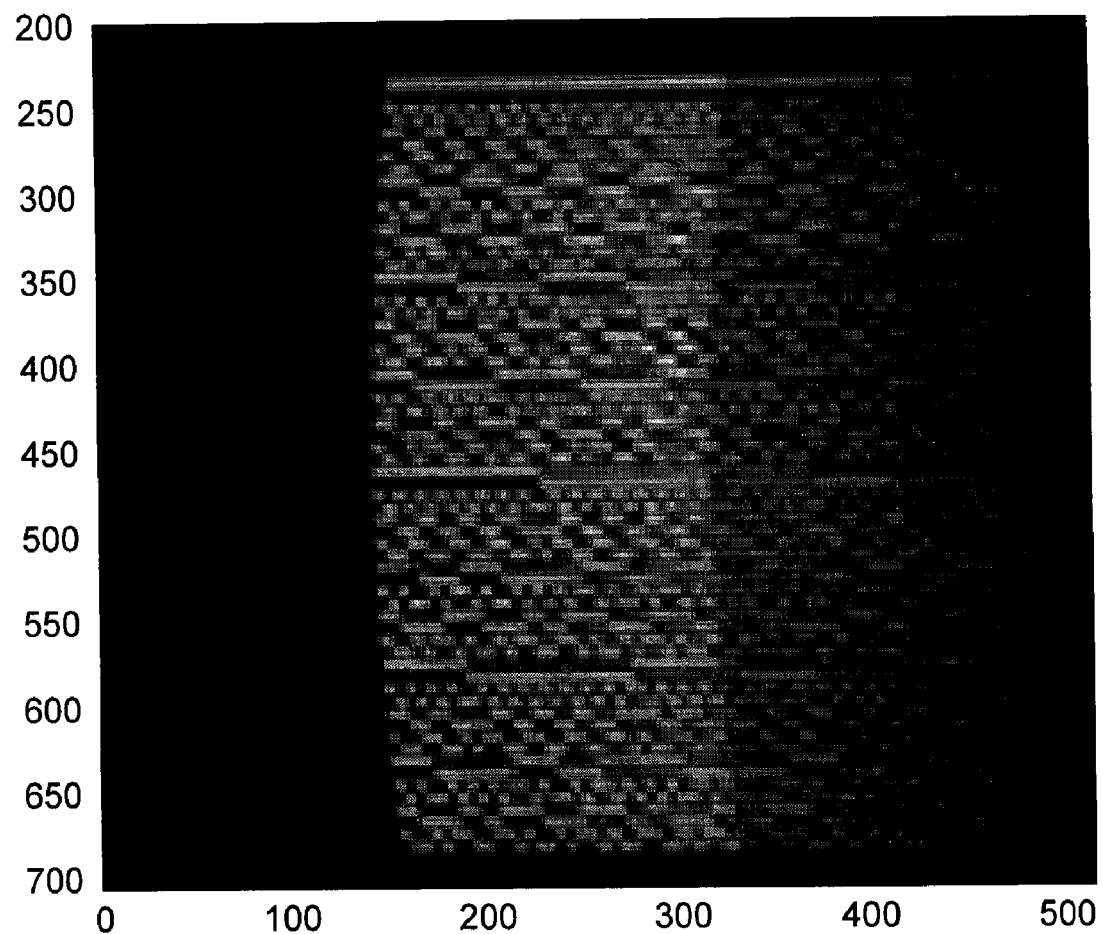
FIG. 7 is an exemplary raw image captured at the focal plane illustrating smile distortion.

It is well known that imaging an aperture through a diffraction grating results in an image that is curved in the direction of the dispersion. In terms of our imaging kernel, this manifests as a $\lambda_c$ that is y-dependent. This curvature, which is sometimes referred to as smile distortion is the result of the particular geometry of the wave-normal sphere. For high-F/# systems, the curvature is minimal and can be ignored. However, since maximizing etendue is described a static MMS is almost always constructed at very low-F/#. As a result, the curvature is significant, as can be seen in FIG. 7. The spectral source has only sharp spectral lines, so the image in FIG. 7 contains only a few, crisp images of the mask pattern.

These variations are resolved by digital correction of the measured image, correction optics or by pre-distortion of the coding mask. For mask-level correction, one measures or calculates the distortion due to the optical system and then implements a coding mask such that the distorted image of the mask, rather than the mask itself, is the appropriate orthogonal column code.

Digital compensation techniques can be used to correct for the spectrum line curvature and the nonlinear dispersion of the spectra onto the detector array prior to spectral estimation. By use of a calibration source with narrow peaks such as a gas discharge lamp, calibration parameters can be stored and used on further data sets.

Figure 8:
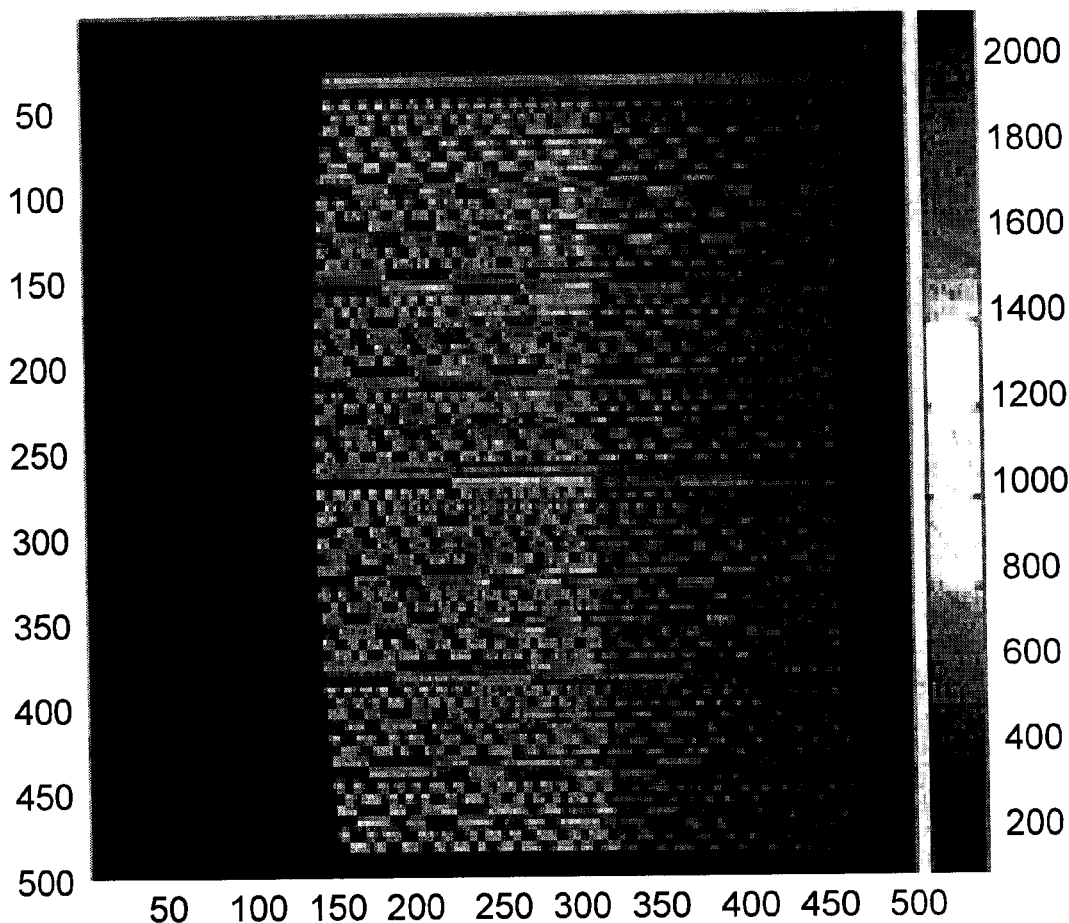
FIG. 8 is an exemplary charge coupled device image showing uncorrected spectral line curvature as a function of vertical field position, in accordance with an embodiment of the present invention.

FIG. 8 is an exemplary CCD image 800 showing uncorrected spectral line curvature as a function of vertical field position, in accordance with an embodiment of the present invention. Image 800 was obtained using a xenon pen lamp, a N=32 Hadamard encoding mask, and the optical system described earlier. The linear displacement from a straight image, $\Delta\beta$, can be described by $$\Delta\beta = \left(\frac{\gamma^2}{2}\right)\lambda A$$

where $\gamma$ is the vertical angle of the ray hitting the grating, $\lambda$ is the wavelength of the light, and A is the angular dispersion of the grating for a nonzero $\gamma$.

In one embodiment of the present invention, to digitally correct for the linear displacement, the CCD image is first interpolated to a higher resolution horizontally using a cubic spline function. A vector is then formed of column positions of vertical features of the mask and a vector of the corresponding rows is formed as well. A polynomial fit is then used to find a relationship between the linear displacement and the CCD row. For narrow wavelength ranges, the same correction can be used for all the columns of the CCD. If broader wavelength ranges or higher resolution corrections are required, then mask features from multiple spectral lines have to be used, and the correction is dependent on the CCD column as well.

Figure 9:
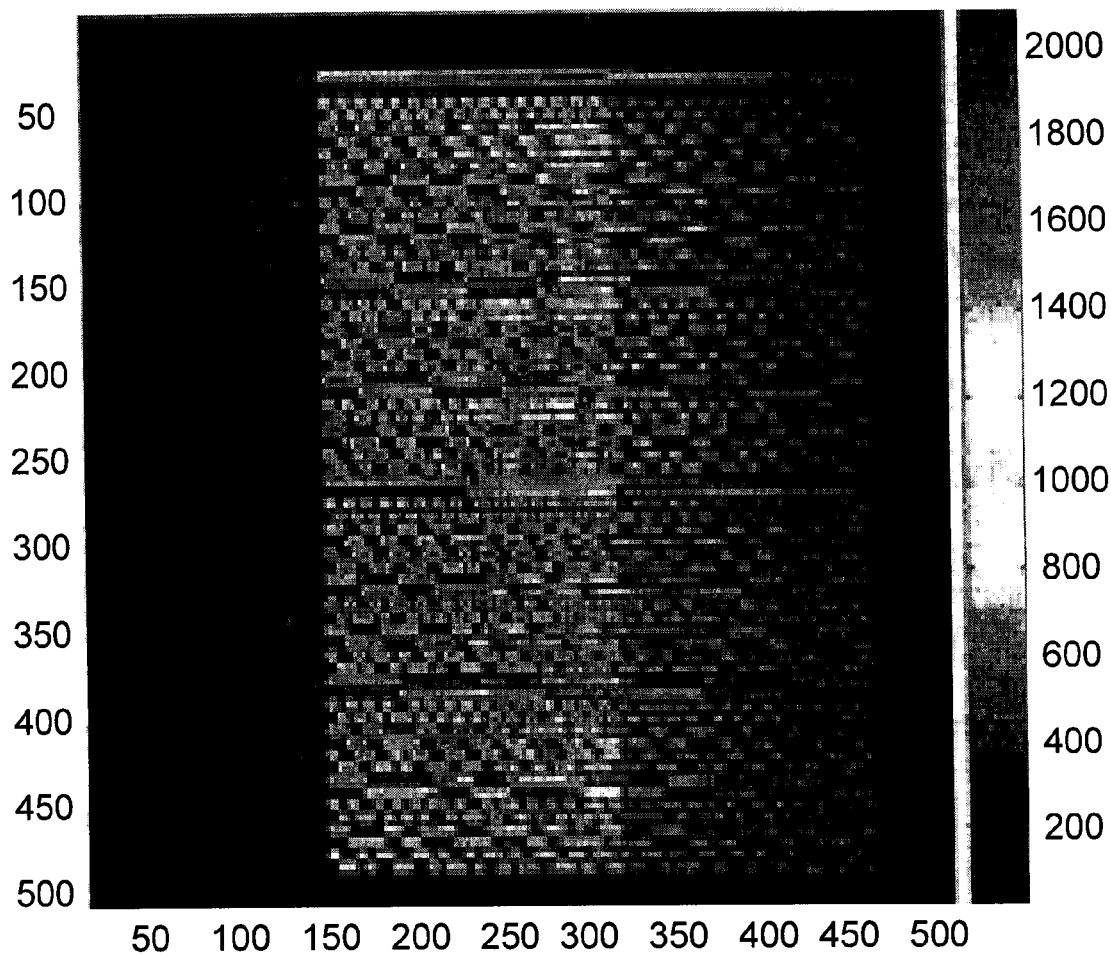
FIG. 9 is an exemplary charge coupled device image showing corrected spectral line curvature as a function of vertical field position, in accordance with an embodiment of the present invention.

FIG. 9 is an exemplary CCD image 900 showing corrected spectral line curvature as a function of vertical field position, in accordance with an embodiment of the present invention.

In another embodiment of the present invention, a digital correction technique is used that involves averaging the multiple spectral estimates. After the inversion of the formatted CCD data, spectral estimates at the different slit positions are determined. The grating equation for a transmissive grating, is $$m\lambda = \sigma(\sin\beta - \sin\alpha)$$

where m is the order of the diffraction, $\lambda$ the wavelength, $\sigma$ a constant related to the grating frequency, $\beta$ the angle in the horizontal plane of the diffracted ray, and $\alpha$ the angle of incidence onto the grating in the horizontal plane. Due to the nonlinearity of this equation, the different spectral estimates cannot be simply shifted by a certain number of pixels without a reduction in resolution and peak height for regions of the reconstructed spectra. To correct for this nonlinearity, a reconstructed data set from a calibration source such as a pen lamp is also used. Vectors are then formed of the pixel positions of the strongest peaks in the spectra for each spectral estimate. Vectors are then formed of the required pixel positions in order to keep the spacing of the peaks the same in each estimate, since the source spectra line positions are fixed. A polynomial fit is performed to relate the column of the CCD and its deviation from these required pixel positions. The reconstructed spectra are then resampled using this polynomial fit onto a corrected axis. The spectra are aligned and summed in order to form a spectral estimate.

Figure 10:
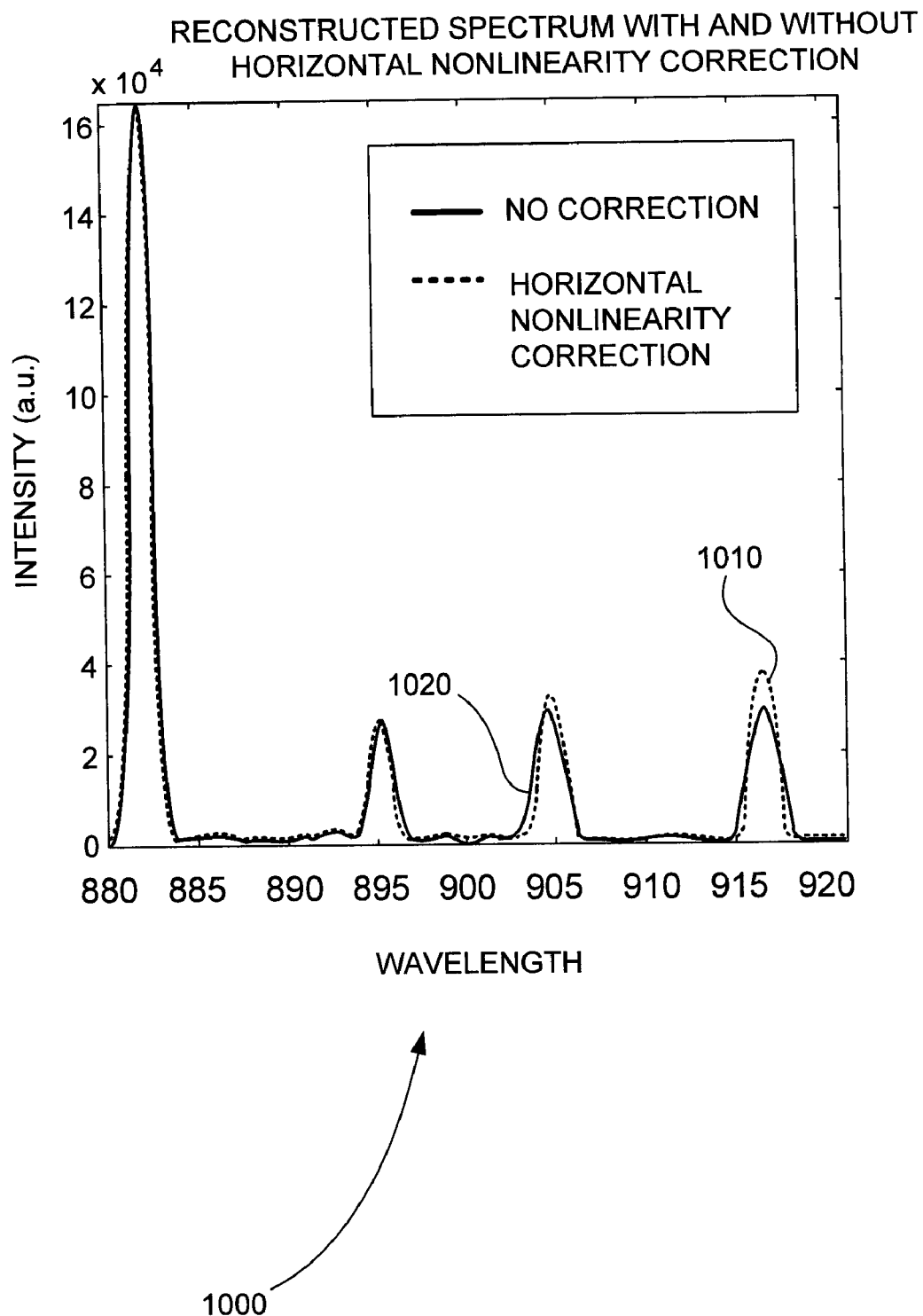
FIG. 10 is an exemplary plot of reconstructed spectrum with horizontal nonlinearity correction and reconstructed spectrum without horizontal nonlinearity correction, in accordance with an embodiment of the present invention.

FIG. 10 is a plot 1000 exemplary of reconstructed spectrum with horizontal nonlinearity correction 1010 and reconstructed spectrum without horizontal nonlinearity correction 1020, in accordance with an embodiment of the present invention. As can be seen in plot 1000, the width of the far peak is decreased and its height increased after the correction is performed. The calibration data for both corrections are stored, and are used for every future reconstruction involving arbitrary sources.

A variety of spectrometers based on the ideas and codes described above (specifically, row doubled implementations of the Hadamard masks described above) have been constructed. The different instruments have been used for Raman, fluorescence, and absorption spectroscopy; spanned the spectral range from the UV to the NIR; demonstrated both reflective and transmissive geometries; and achieved spectral resolutions ranging from $\Delta\lambda \approx 0.1$-3 nm. Performance of the instruments has invariably been excellent, significantly outperforming traditional spectrometers on diffuse sources.

Following are of experimental results collected on a static MMS systems according to an embodiment. The results demonstrate the existence of the Jacquinot and Fellgett advantages and show that the performance scales as expected.

In all the experiments described below, the spectral source was a xenon dis-charge lamp operated in conjunction with an integrating sphere. The light from the integrating sphere was allowed to fall directly on the mask aperture no relay optics of any kind were used. Unless otherwise noted, the CCD integration time was 160 ms. The particular spectrometer has a spectral range of $\Delta\Lambda \approx 775$-900 nm. The spectral resolution depends on the mask used. For the majority of the masks, the resolution is $\delta\lambda \approx 0.65$ nm. The masks consisted of chrome deposited on a quartz substrate. The smallest mask feature was 36 gm, corresponding to 4 pixels on the CCD.

Figure 11:
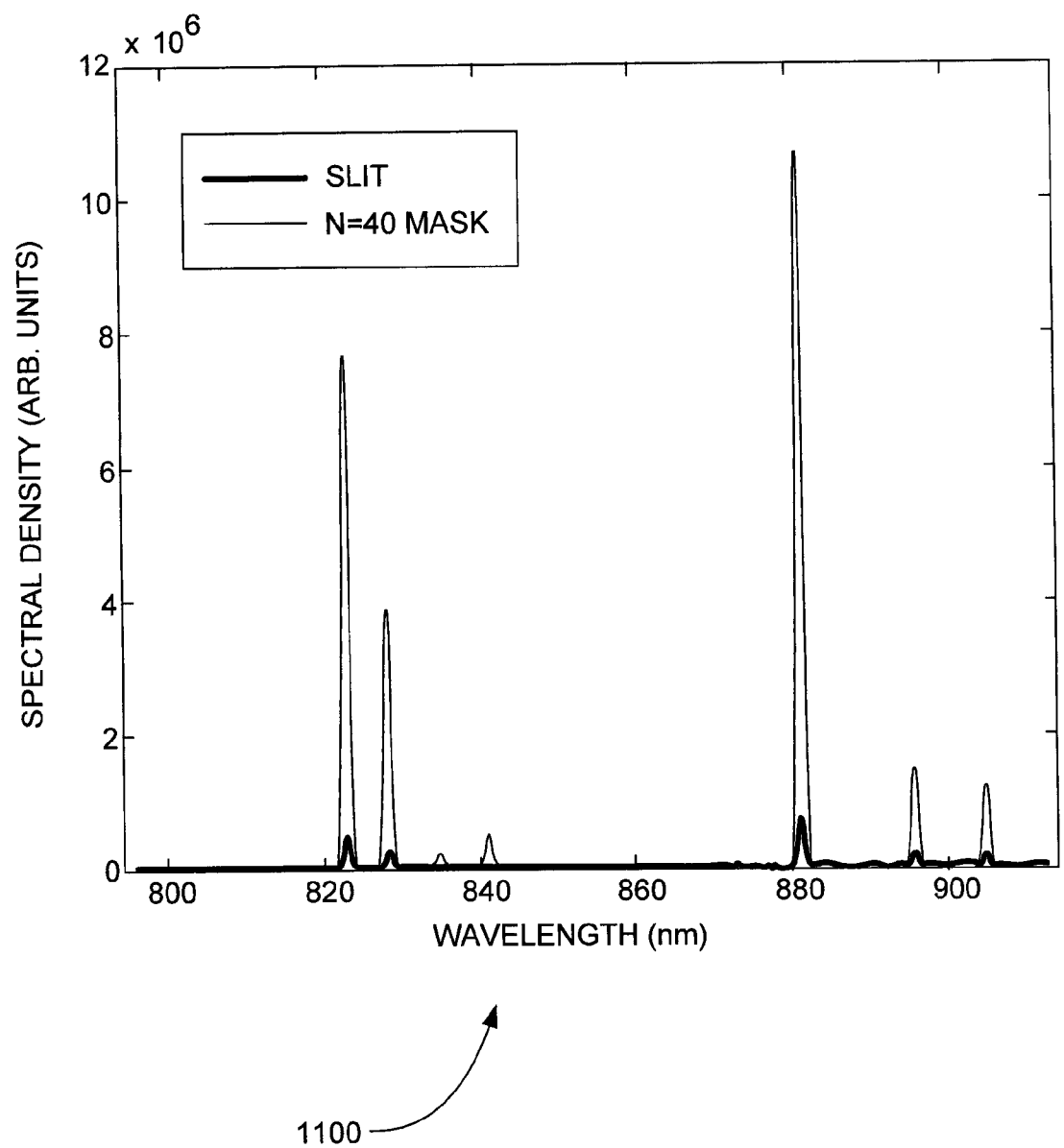
FIG. 11 is a graphical comparison of results from a reconstructed spectrum from a mask based on $\hat{H}_{40}$ and a slit aperture.

FIG. 11 compares the spectrum reconstructed from an order-40, row-doubled Hadamard mask and from a slit with a width (36 µm) equal to the feature size of the mask. As can be seen from FIG. 11, coded aperture collects significantly more light, without sacrificing spectral resolution.

Figure 12:
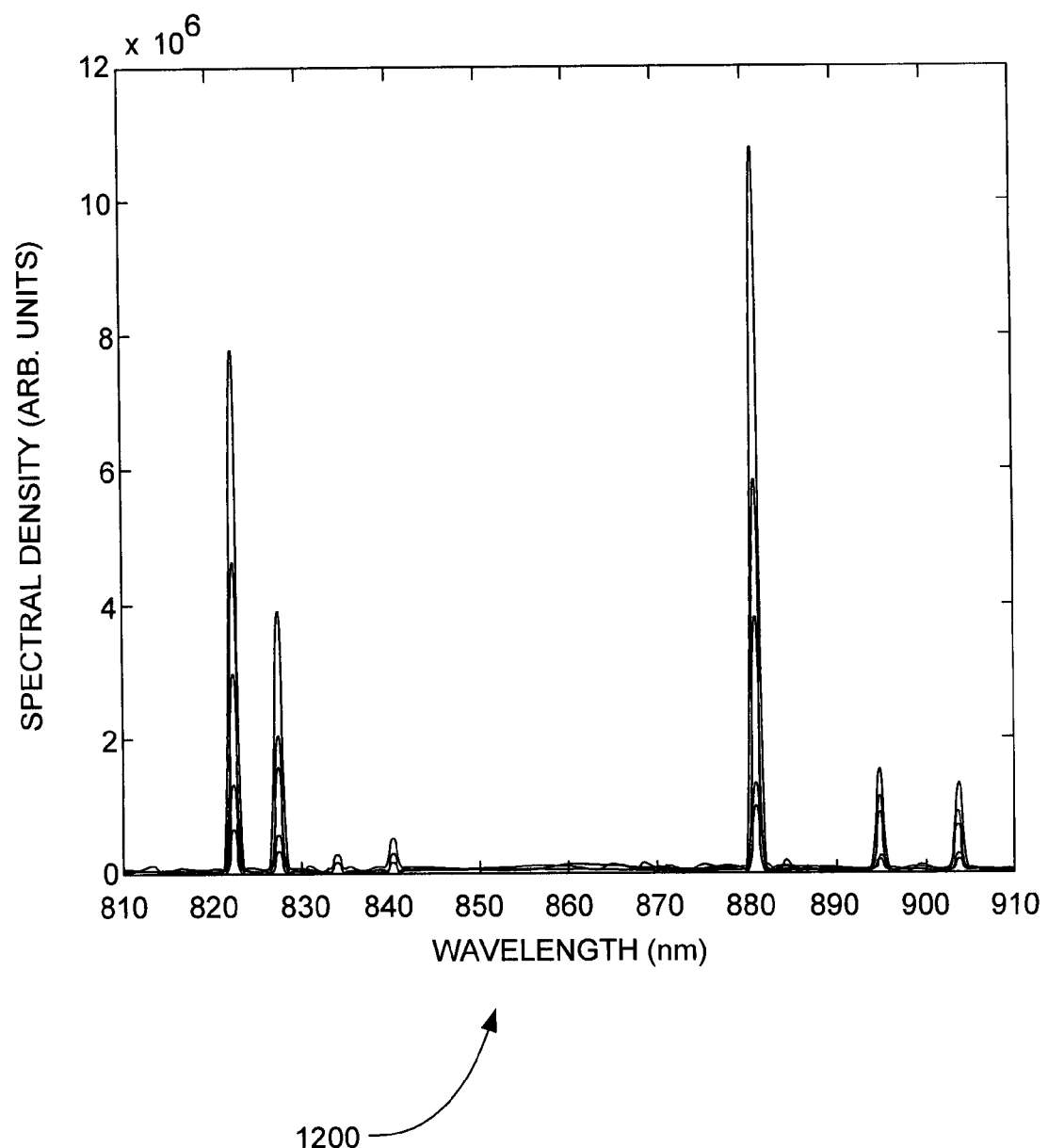
FIG. 12 is a graphical comparison of results from reconstructed spectra from row-doubled Hadamard masks of various orders.

Row-doubled Hadamard masks of a variety of orders (N=40, 32, 24, 16, 12) were implemented. In FIG. 12, the results from these different masks are plotted. The signal strength increases as the mask order increases, without affecting spectral resolution. However, determining the throughput advantage is complicated by the fact that as the mask order increases, there is an increase in not only the number of openings on a given row of the mask, but also in the number of mask rows as well. To check the throughput scaling, the total counts collected for a given mask are normalized by dividing by the total counts collected with a slit that occupies an equal number of rows on the CCD. In a row-doubled Hadamard mask, there are N/2 openings on any row. As such, we would expect the normalized counts to also scale by this amount. The results are plotted in FIG. 13.

Figure 13:
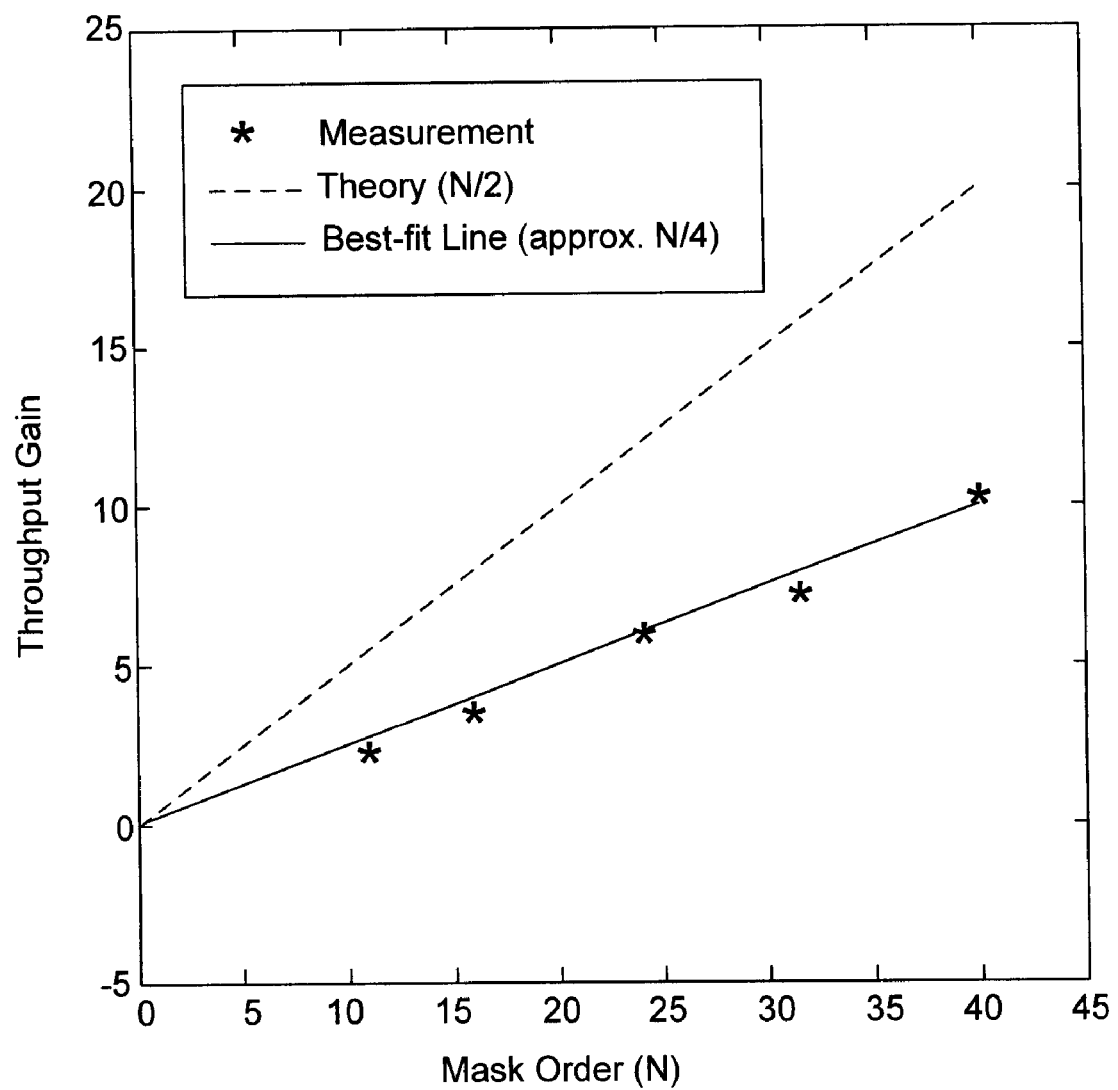
FIG. 13 illustrates throughput gain achieved by order-N masks compared to slits of equivalent height.

FIG. 13 illustrates that the observed scaling is approximately N/4, rather than the expected N/2. We believe the discrepancy can be attributed to the optical system in the spectrometer. Because the reduction in light collection is a constant factor of 2, regardless of mask size, we can rule out vignetting as the cause. Rather, we believe the effect arises from the modulation transfer function (MTF) of the optics. In the horizontal direction, the Hadamard masks and the slit have the same range of spatial frequencies. Vertically, however, the slit contains only a DC component, while the masks contain high frequencies from the row-doubling. Experimentally, when we compare the counts on a single row of the CCD between the mask and the slit, we observe a ratio of approximately N/4 as measured for the entire pattern. If we instead compare the counts on a row between the mask and a square pinhole, we observe a ratio of approximately N/2 as theory would predict. Thus we conclude that the discrepancy is related to the MTF of the optical system.

Figure 14A:
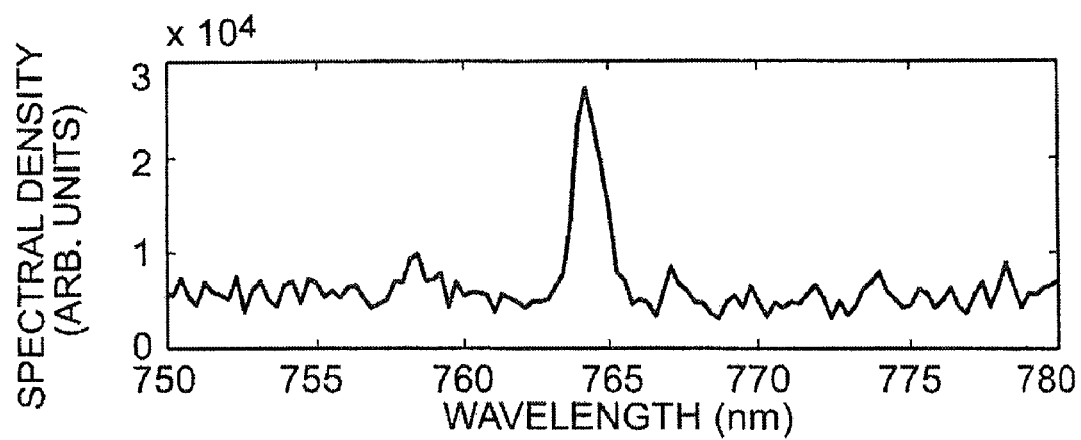
FIGS. 14a and 14b is a graphical comparison of a small spectral peak as reconstructed by a mask based on $\hat{H}_{40}$ and a slit aperture.
Figure 14B:
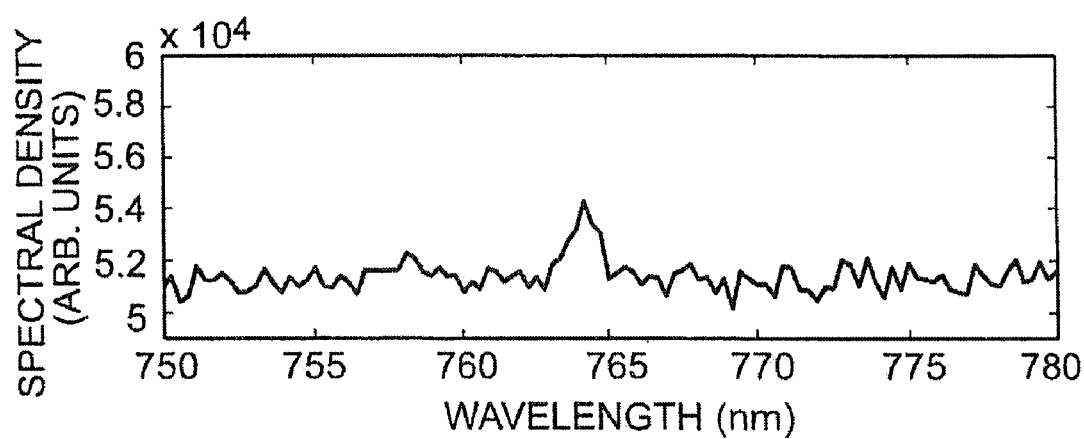

Finally, we attempt to quantify the improvement in signal-to-noise-ratio SNR that accompanies the increase in throughput. FIGS. 14a and 14b shows a region of the xenon spectrum containing a very small peak (so weak that it is not visible at the scales of the previous figures). FIG. 14a shows the peak as reconstructed by the row-doubled, order-40 Hadamard mask. The bottom plot is the peak as measured by the slit aperture.

If the SNR of the peak is defined to be its height divided by the rms value of the region near the peak, we find that the SNR for the mask aperture is $\approx 23.7$ while the SNR for the slit is $\approx 7.0$. This is an SNR gain of $23.7/7.0 \approx 3.4$. From FIG. 13, it can be seen that the mask provided a throughput advantage of 10.3. For a shot-noise process we would expect this throughput gain to result in an SNR gain of $\sqrt{10.3} \approx 3.2$, which is indeed close to the observed value.

Relay Optics Design

In many cases, the source of interest is spatially non-uniform. A source of interest that is spatially non-uniform is modeled by assuming that the input spectral density is S $(x,y,\lambda)$. Spectral analysis with orthogonal column codes requires that the spectral density be uniform or approximately uniform with respect to y.

Figure 15:
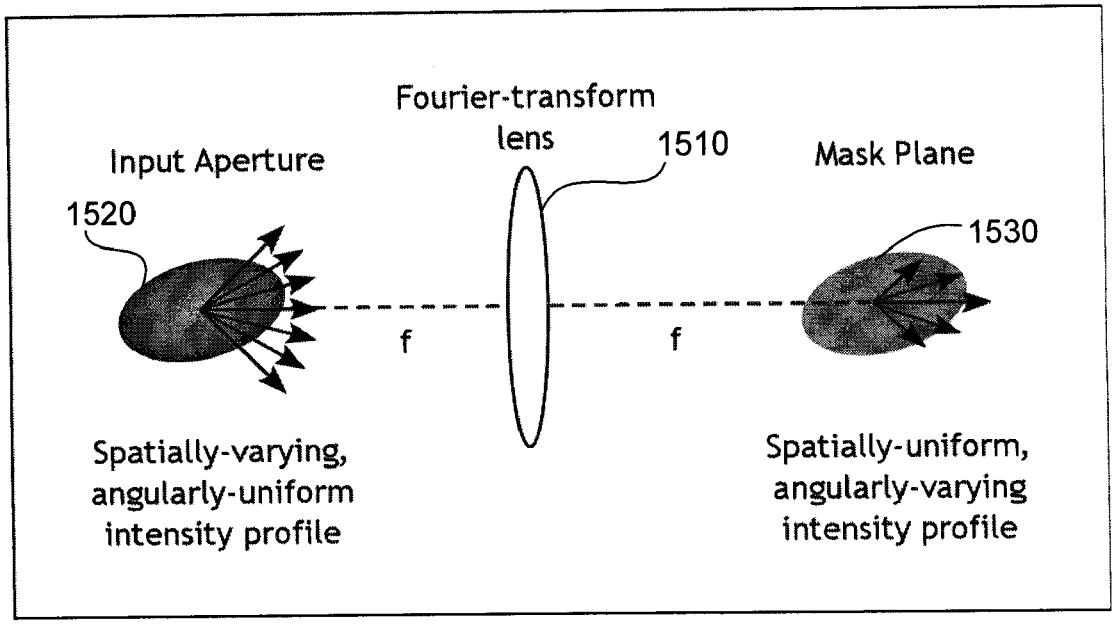
FIG. 15 is a schematic diagram showing an exemplary system for converting a spatially non-uniform source of interest to a spatially uniform source of interest using a Fourier-transform lens, in accordance with an embodiment of the present invention.

FIG. 15 is a schematic diagram showing an exemplary system 1500 for converting spatially non-uniform source of interest to a spatially uniform source of interest using a Fourier-transform lens 1510, in accordance with an embodiment of the present invention. If the source radiation is spatially incoherent in an input plane 1520, placing Fourier-transform lens 1510 between input plane 1520 and a mask plane 1530 produces a uniform illumination. Fourier-transform lens 1510 is situated one focal length from source input plane 1520 and one focal length from coding mask plane 1530.

Figure 16:
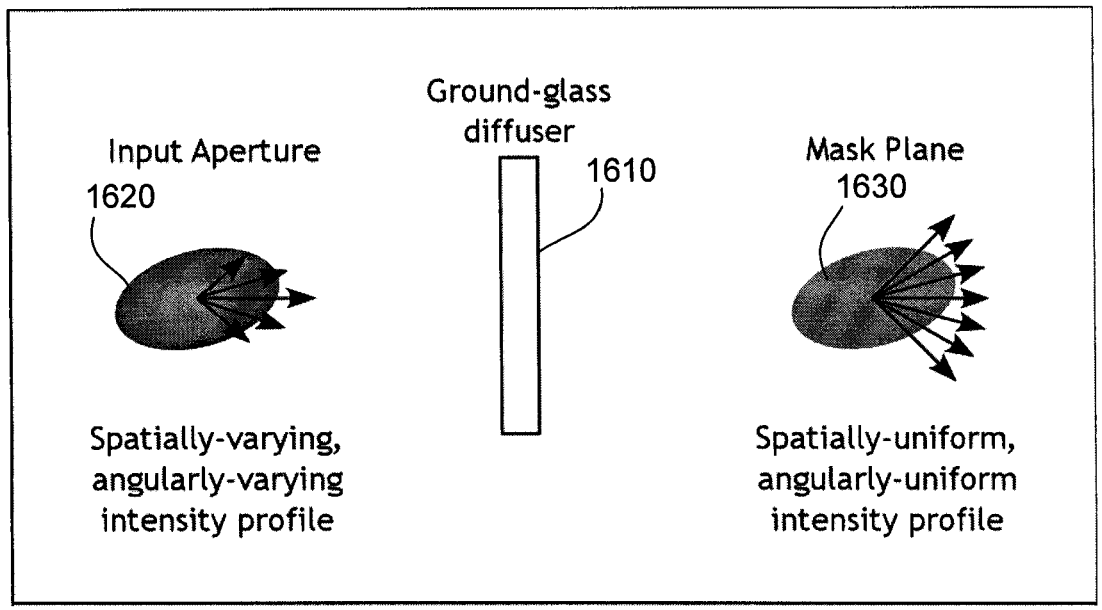
FIG. 16 is a schematic diagram showing an exemplary system for converting a spatially non-uniform source of interest to a spatially uniform source of interest using a ground-glass diffuser, in accordance with an embodiment of the present invention.

FIG. 16 is a schematic diagram showing an exemplary system 1600 for converting a spatially non-uniform source of interest to a spatially uniform source of interest using a ground-glass diffuser 1610, in accordance with an embodiment of the present invention. If the incoherence of a source cannot be guaranteed, placing a ground glass diffuser 1610 between input plane 1620 and mask plane 1630 produces a uniform illumination.

Figure 17:
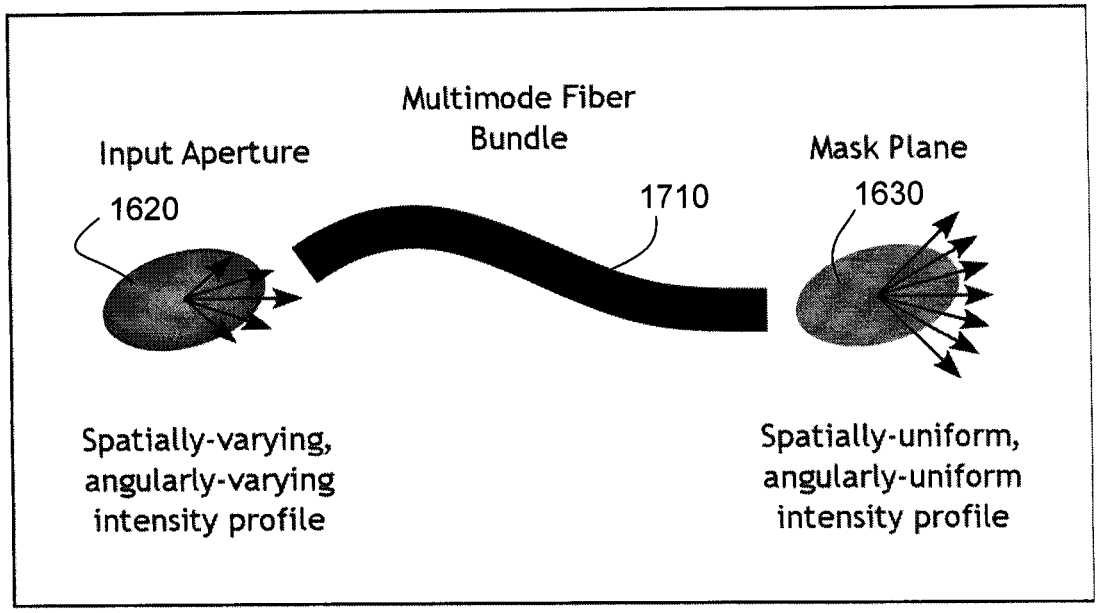
FIG. 17 is a schematic diagram showing an exemplary system for converting a spatially non-uniform source of interest to a spatially uniform source of interest using a multimode fiber bundle, in accordance with an embodiment of the present invention.

FIG. 17 is a schematic diagram showing an exemplary system 1700 for converting a spatially non-uniform source of interest to a spatially uniform source of interest using a multimode fiber bundle 1710, in accordance with an embodiment of the present invention. Similarly, if the incoherence of a source cannot be guaranteed, placing multimode fiber bundle 1710 between input plane 1620 and mask plane 1630 produces a uniform illumination.

Using a spherical Fourier transform lens alone or with an optical diffuser, the spectral density in the coded mask plane may be assumed to be $S(\lambda) = \int\int S(x,y,\lambda) dx dy$, such that the ultimately resolved spectrum is equal to the mean spectral density of the source.

Figure 18:
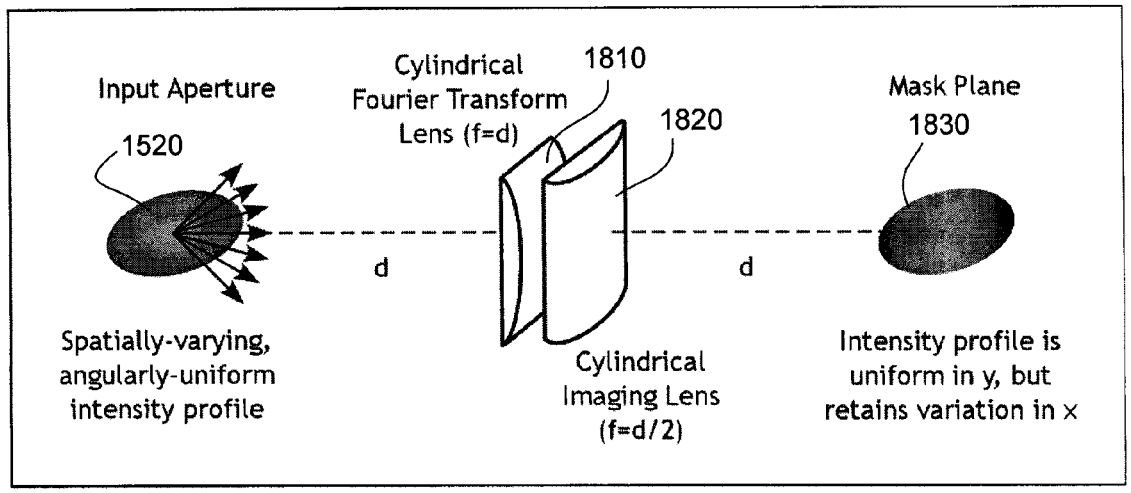
FIG. 18 is a schematic diagram showing an exemplary system for astigmatic imaging and intensity field homogenization using astigmatic optics, in accordance with an embodiment of the present invention.

Spatial uniformity in the x direction is not necessary for spectral reconstruction. FIG. 18 is a schematic diagram showing an exemplary system 1800 for astigmatic imaging and intensity field homogenization using astigmatic optics, in accordance with an embodiment of the present invention. Spatial uniformity in the y direction and imaging in the x direction may be achieved using astigmatic optics such that the y direction focal length is twice the x direction focal length. In system 1800, placing cylindrical Fourier-transform lens 1810 and cylindrical imaging lens 1820 between input plane 1520 and mask plane 1830 produces a uniform intensity field in the y direction, but retains variation in the x direction. In system 1800, the spectral density on coded mask plane 1830 is $$S(x, \lambda) = \int S(x,y,\lambda) dy \qquad (38)$$

The signal from the detector array is $$g(x, y) = \int_{\lambda_{min}}^{\lambda_{max}} S(x - \gamma\lambda, \lambda) t(x - \gamma\lambda, y) d\lambda \quad (39)$$

such that $$\int_{-y_{max}}^{y_{max}} g(x - \gamma\lambda, y)\tau(x, y) dy \approx S(x, \lambda) \quad (40)$$

For system 1800, therefore, a one-dimensional spatial image of the spectral density is obtained.

Figure 19:
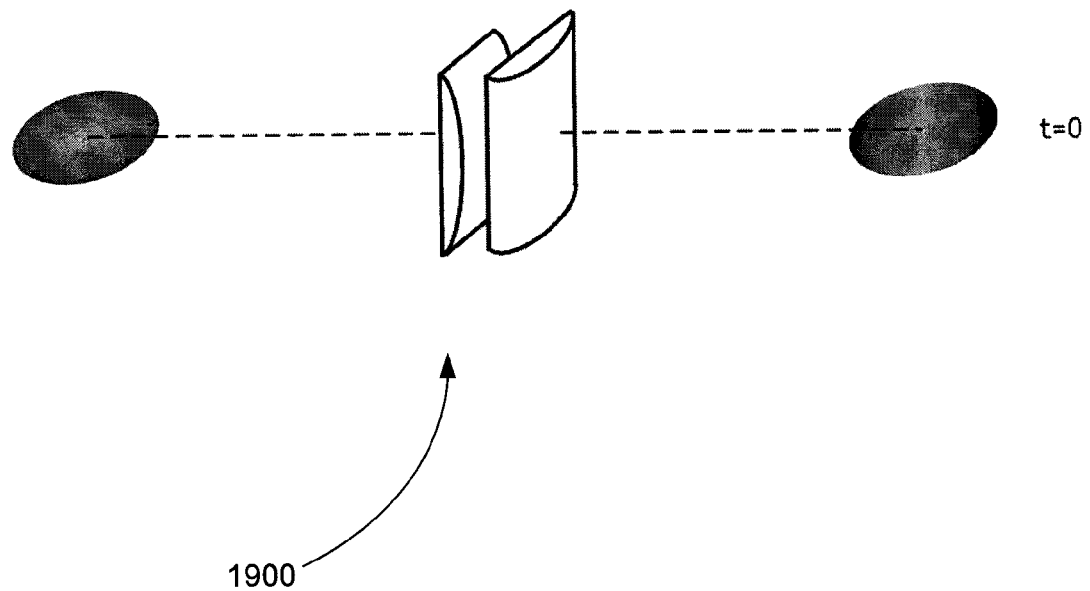
FIG. 19 is a schematic diagram showing an exemplary snapshot of input aperture rotation and astigmatic imaging and intensity field homogenization at time t=0 of an exemplary astigmatic optical system for use in spectrotomographic imaging, in accordance with an embodiment of the present invention.

FIG. 19 is a schematic diagram showing an exemplary snapshot 1900 of input aperture rotation and astigmatic imaging and intensity field homogenization at time t=0 of exemplary astigmatic optical system 1800 for use in spectrotomographic imaging, in accordance with an embodiment of the present invention.

Figure 20:
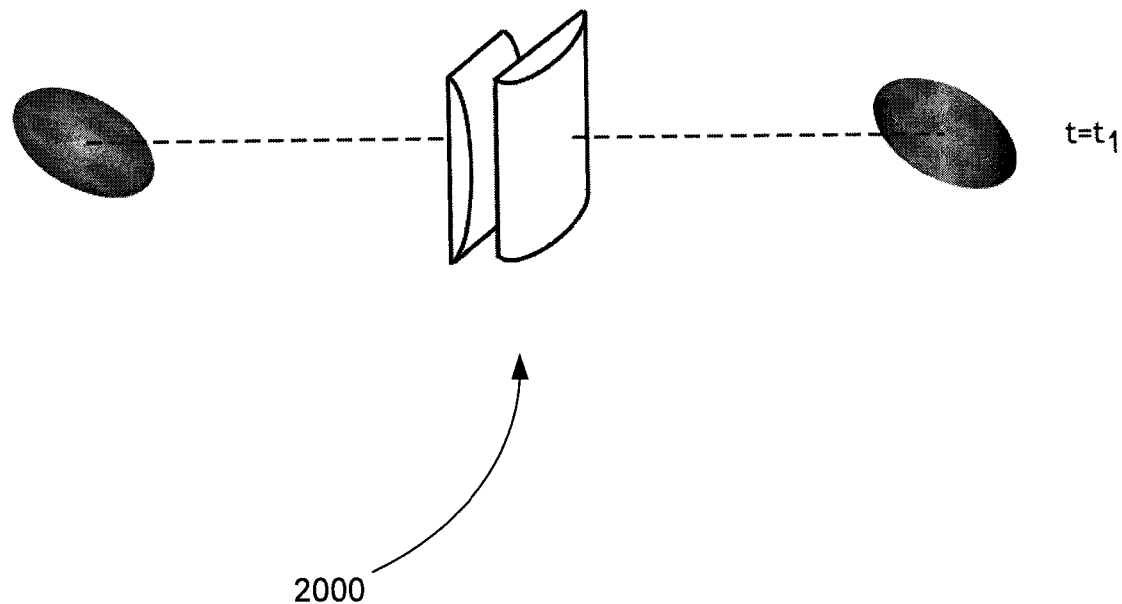
FIG. 20 is a schematic diagram showing an exemplary snapshot of input aperture rotation and astigmatic imaging and intensity field homogenization at time t=$t_1$ of an exemplary astigmatic optical system for use in spectrotomographic imaging, in accordance with an embodiment of the present invention.

FIG. 20 is a schematic diagram showing an exemplary snapshot 2000 of input aperture rotation and astigmatic imaging and intensity field homogenization at time $t=t_1$ of exemplary astigmatic optical system 1800 for use in spectrotomographic imaging, in accordance with an embodiment of the present invention.

Figure 21:
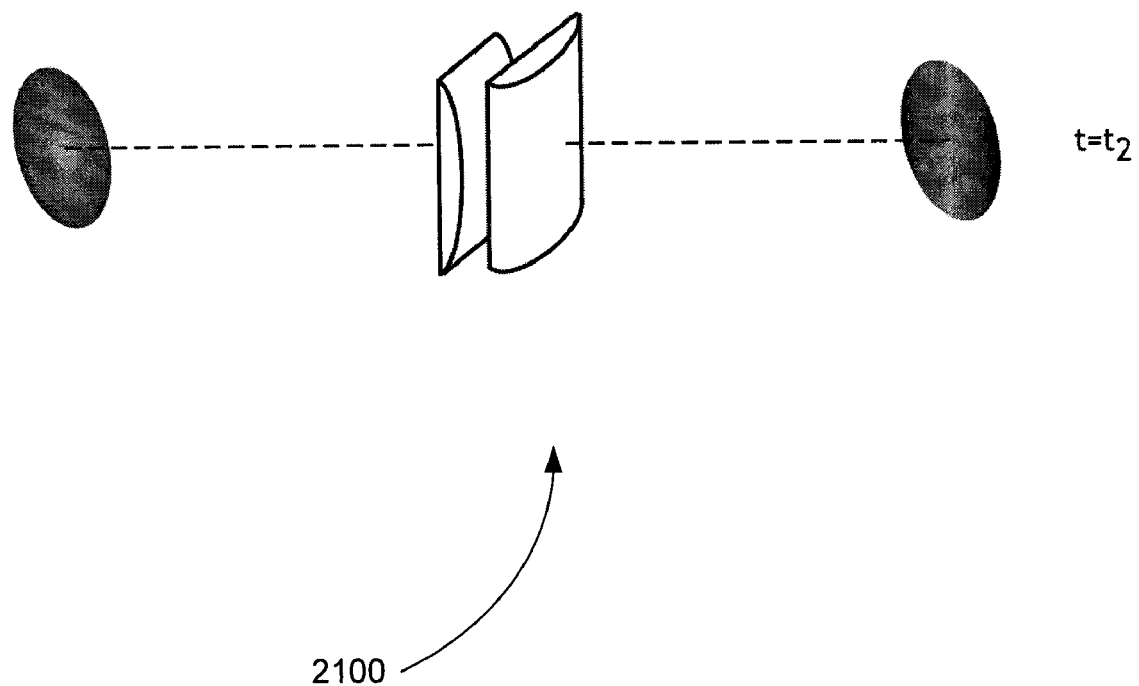
FIG. 21 is a schematic diagram showing an exemplary snapshot of input aperture rotation and astigmatic imaging and intensity field homogenization at time t=$t_2$ of an exemplary astigmatic optical system for use in spectrotomographic imaging, in accordance with an embodiment of the present invention.

FIG. 21 is a schematic diagram showing an exemplary snapshot 2100 of input aperture rotation and astigmatic imaging and intensity field homogenization at time $t=t_2$ of exemplary astigmatic optical system 1800 for use in spectrotomographic imaging, in accordance with an embodiment of the present invention.

Figure 22:
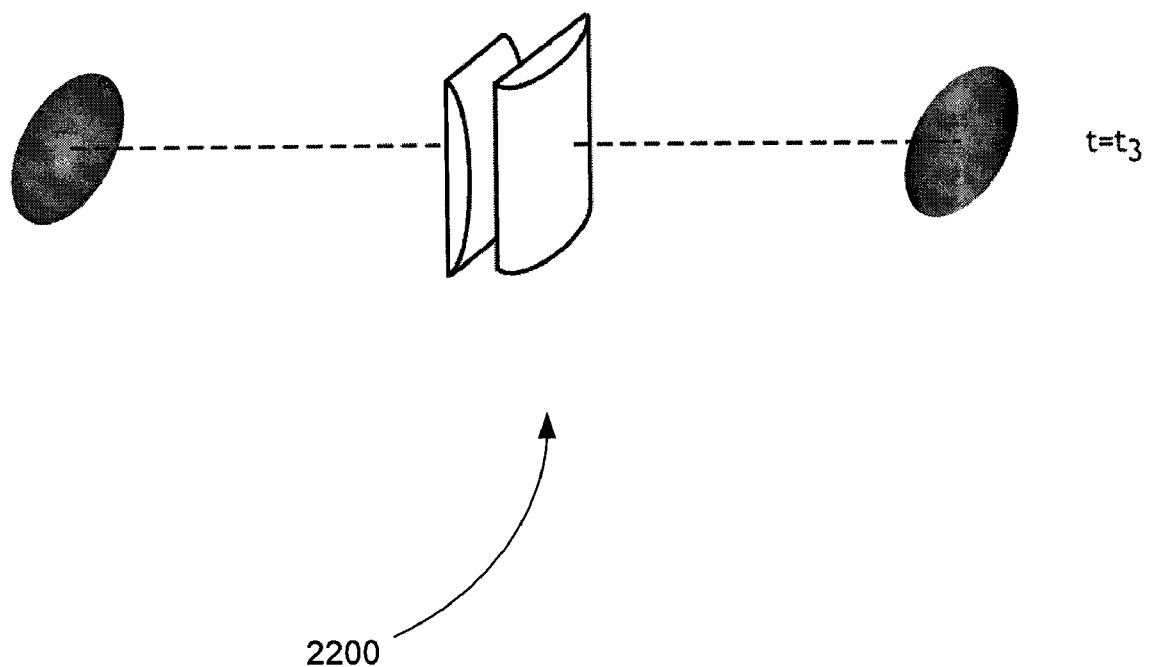
FIG. 22 is a schematic diagram showing an exemplary snapshot of input aperture rotation and astigmatic imaging and intensity field homogenization at time t=$t_3$ of an exemplary astigmatic optical system for use in spectrotomographic imaging, in accordance with an embodiment of the present invention.

FIG. 22 is a schematic diagram showing an exemplary snapshot 2200 of input aperture rotation and astigmatic imaging and intensity field homogenization at time $t=t_3$ of exemplary astigmatic optical system 1800 for use in spectrotomographic imaging, in accordance with an embodiment of the present invention.

Figure 23:
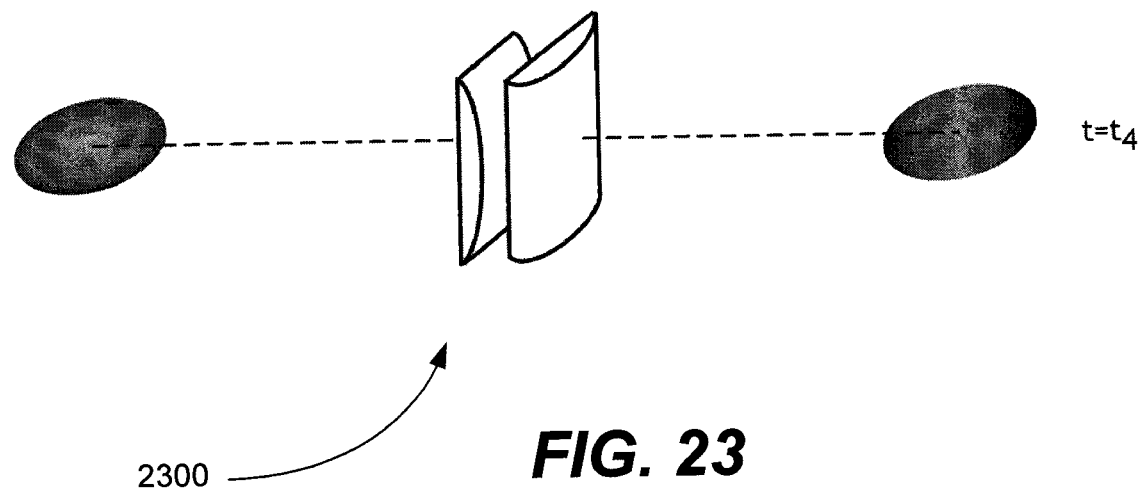
FIG. 23 is a schematic diagram showing an exemplary snapshot of input aperture rotation and astigmatic imaging and intensity field homogenization at time t=$t_4$ of an exemplary astigmatic optical system for use in spectrotomographic imaging, in accordance with an embodiment of the present invention.

FIG. 23 is a schematic diagram showing an exemplary snapshot 2300 of input aperture rotation and astigmatic imaging and intensity field homogenization at time $t=t_4$ of exemplary astigmatic optical system 1800 for use in spectrotomographic imaging, in accordance with an embodiment of the present invention.

FIGS. 19-23 illustrate image rotation in the input aperture of system 1800. Such rotation is achieved by a prism combination or by rotating the imaging spectrometer. For each rotation of the input source image 1520, an estimated one-dimensional spectrum is obtained of the form $$S(x,\theta,\lambda) = \int S(x'=x\cos\theta + y\sin\theta, y'=-x\sin\theta + y\cos\theta, \lambda) dy \quad (41)$$

where x' and y' are transverse coordinates in a canonical coordinate system and x and y are rotated transverse coordinates. Eqn. (41) constitutes the Radon transform in the x,y plane of $S(x,y,\lambda)$ and is invertible by standard tomographic methods, such as convolution back projection. Thus, using the astigmatic relay optics of System 1100 and source rotation a three-dimensional spatio-spectral image of an incoherent source can be formed.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM")) as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Systems and methods in accordance with an embodiment of the present invention disclosed herein can advantageously maximize spectrometer throughput without sacrificing spectral resolution and maximize the signal-to-noise ratio of an estimated spectrum for a given system throughput and detector noise.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A static multimode multiplex spectrometer, comprising:
    a two-dimensional independent column code mask, wherein source radiation is incident on the mask, wherein the transmissive and opaque elements of the mask are arranged according to a transfer function represented mathematically as a coding matrix, and wherein each column of the coding matrix is independent under an inner product transformation;
    a dispersive element aligned with the coded mask, wherein source radiation transmitted through the mask is incident on the dispersive element such that the dispersive element induces a wavelength dependent spatial shift of the image of the mask;
    a two-dimensional detector array aligned with the dispersive element, wherein source radiation from the dispersive element is incident on the array, wherein the array comprises row and column detector elements, and wherein the detector elements convert the wavelength dependent spatial shift image of the mask into a light intensity values; and
    a processing unit, wherein the processing unit stores the values in a data matrix and performs a transformation of the data matrix using the coding matrix to produce a spectrum matrix that is a mathematical representation of a spectral density of the source radiation.

2. The static multimode multiplex spectrometer of claim 1, wherein the coding matrix is a Hadamard matrix.

3. The static multimode multiplex spectrometer of claim 1, wherein the coding matrix is a S-matrix.

4. The static multimode multiplex spectrometer of claim 1, wherein the coding matrix consists of approximately orthogonal columns using one of random sequences, pseudorandom sequences, and perfect sequences.

5. The static multimode multiplex spectrometer of claim 1, wherein the coding matrix is formed from continuous orthogonal function families comprising one of harmonic functions and wavelet functions.

6. The static multimode multiplex spectrometer of claim 1, wherein the coding matrix is formed from continuous orthogonal function families.

7. The static multimode multiplex spectrometer of claim 1, wherein the dispersive element is one or more of a grating, a holographic grating, and a prism.

8. The static multimode multiplex spectrometer of claim 1, wherein the array is a two-dimensional charge coupled device, an active pixel photodetector array, a microbolometer array or a photodiode array.

9. The static multimode multiplex spectrometer of claim 1, wherein the processing unit is one or more of a computer, a microprocessor, and an application specific circuit.

10. The static multimode multiplex spectrometer of claim 1, wherein the processing unit uses a digital compensation technique to correct for spectrum line curvature and nonlinear dispersion of the spectra onto the detector array.

11. The static multimode multiplex spectrometer of claim 1, wherein the system can be used to obtain a one-dimensional spatial image of source radiation spectral density instead of the average spectral density.

12. The static multimode multiplex spectrometer of claim 1, wherein a three-dimensional image of the source radiation spectral density is formed by one or more of rotating a source, rotating the static multimode multiplex spectrometer, and rotating a presentation of the source to the static multimode multiplex spectrometer.

13. A static multimode multiplex spectrometer, comprising:
   a two-dimensional independent column code mask, wherein source radiation is incident on the mask, wherein the transmissive and opaque elements of the mask are arranged according to a transfer function represented mathematically as a coding matrix, and wherein each column of the coding matrix is independent under an inner product transformation;
   a dispersive element aligned with the coded mask, wherein source radiation transmitted through the mask is incident on the dispersive element such that the dispersive element induces a wavelength dependent spatial shift of the image of the mask;
   an optical system located between the source radiation and the mask that converts non-uniform spectral density of the source radiation to substantially uniform spectral density in at least one direction;
   a two-dimensional detector array aligned with the dispersive element, wherein source radiation from the dispersive element is incident on the array, wherein the array comprises row and column detector elements, and wherein the detector elements convert the wavelength dependent spatial shift image of the mask into a light intensity values; and
   a processing unit, wherein the processing unit stores the values in a data matrix and performs a transformation of the data matrix using the coding matrix to produce a spectrum matrix that is a mathematical representation of a spectral density of the source radiation.

14. The static multimode multiplex spectrometer of claim 13, wherein a Fourier transform lens is placed between the source and the mask to convert a spatially non-uniform source to a spatially uniform one.

15. The static multimode multiplex spectrometer of claim 13, wherein a ground-glass diffuser is placed between the source and the mask for uniform illumination of the mask.

16. The static multimode multiplex spectrometer of claim 13, wherein a multimode fiber bundle placed between the source and the mask produces a uniform illumination.

17. A static multimode multiplex spectrometer, comprising:
   a two-dimensional independent column code mask, wherein source radiation is incident on the mask, wherein the transmissive and opaque elements of the mask are arranged according to a transfer function represented mathematically as a coding matrix, and wherein each column of the coding matrix is independent under an inner product transformation, and wherein the mask is made up of a series of lithographically etched apertures to implement a coding as described by a discrete matrix of a particular order;
   a dispersive element aligned with the coded mask, wherein source radiation transmitted through the mask is incident on the dispersive element such that the dispersive element induces a wavelength dependent spatial shift of the image of the mask;
   a two-dimensional detector array aligned with the dispersive element, wherein source radiation from the dispersive element is incident on the array, wherein the array comprises row and column detector elements, and wherein the detector elements convert the wavelength dependent spatial shift image of the mask into a light intensity values; and
   a processing unit, wherein the processing unit stores the values in a data matrix and performs a transformation of the data matrix using the coding matrix to produce a spectrum matrix that is a mathematical representation of a spectral density of the source radiation.

18. The static multimode multiplex spectrometer of claim 17, wherein the mask with −1 values of a Hadamard matrix are realized by a row-doubled Hadamard matrix.

19. The static multimode multiplex spectrometer of claim 17, wherein the coded mask is fabricated by converting a continuous-tone mask into a half-toned version to implement gray-scale patterns as defined by a family of independent column codes.

20. The static multimode multiplex spectrometer of claim 17, wherein the mask whose transmissive and opaque elements can be automatically or manually reconfigured through electrical, optical, or mechanical means to produce a variety of transforms and a range of aperture sizes that enables the spectrometer to ideally match the characteristics of the source radiation.

21. The static multimode multiplex spectrometer of claim 19, wherein digital techniques can be applied to reconstruct only select portions of the aperture in order to accommodate for different illumination patterns of the source on the mask.

22. The static multimode multiplex spectrometer of claim 20, wherein digital techniques can be applied to reconstruct only select portions of the aperture in order to accommodate for different illumination patterns of the source on the mask.

* * * * *